(12) United States Patent
Ryu et al.

(10) Patent No.: US 11,632,727 B2
(45) Date of Patent: Apr. 18, 2023

(54) METHOD AND APPARATUS FOR TRANSMITTING SYNCHRONIZATION SIGNAL IN WIRELESS COMMUNICATION SYSTEM

(71) Applicant: Samsung Electronics Co., Ltd., Suwon-si (KR)

(72) Inventors: Hyunseok Ryu, Suwon-si (KR); Jeongho Yeo, Suwon-si (KR); Jinyoung Oh, Suwon-si (KR); Sungjin Park, Suwon-si (KR); Jonghyun Bang, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 16/737,385

(22) Filed: Jan. 8, 2020

(65) Prior Publication Data

US 2020/0229114 A1 Jul. 16, 2020

(30) Foreign Application Priority Data

Jan. 10, 2019 (KR) .......................... 10-2019-0003505

(51) Int. Cl.
*H04W 56/00* (2009.01)
*H04W 76/27* (2018.01)
(Continued)

(52) U.S. Cl.
CPC ........... *H04W 56/001* (2013.01); *G01S 19/51* (2013.01); *H04W 4/40* (2018.02);
(Continued)

(58) Field of Classification Search
None
See application file for complete search history.

(56) References Cited

U.S. PATENT DOCUMENTS

| 7,983,702 B2 | 7/2011 | Li et al. |
| 8,705,421 B2 | 4/2014 | Li et al. |
| (Continued) | | |

FOREIGN PATENT DOCUMENTS

| KR | 10-2016-0003257 A | 1/2016 |
| WO | 2018/143854 A1 | 8/2018 |
| WO | WO-2020033562 A1 * | 2/2020 |

OTHER PUBLICATIONS

International Search Report dated Apr. 14, 2020, issued in an International Application No. PCT/KR2020/000355.
(Continued)

*Primary Examiner* — Saba Tsegaye
(74) *Attorney, Agent, or Firm* — Jefferson IP Law, LLP

(57) ABSTRACT

The disclosure relates to a communication technique for convergence of IoT technology and a $5^{th}$ generation (5G) communication system for supporting a higher data transfer rate beyond a $4^{th}$ generation (4G) system, and a system therefor. The disclosure can be applied to intelligent services (e.g., smart homes, smart buildings, smart cities, smart or connected cars, health care, digital education, retail business, and services associated with security and safety) based on 5G communication technology and IoT-related technology. A method according to the disclosure includes receiving configuration information including a parameter for transmission of a synchronization signal block (SSB) from a base station, identifying a resource for transmission of the SSB based on the parameter, and in case that a condition for transmission of the SSB is satisfied, transmitting the SSB to a second terminal on the resource.

12 Claims, 15 Drawing Sheets

(51) Int. Cl.
*H04W 72/04* (2009.01)
*H04W 4/40* (2018.01)
*H04W 72/0446* (2023.01)
*G01S 19/51* (2010.01)
*H04W 72/0453* (2023.01)
*H04W 92/18* (2009.01)

(52) U.S. Cl.
CPC ... *H04W 72/0446* (2013.01); *H04W 72/0453* (2013.01); *H04W 76/27* (2018.02); *H04W 92/18* (2013.01)

(56) References Cited

U.S. PATENT DOCUMENTS

| | | | |
|---|---|---|---|
| 9,756,613 | B2 | 9/2017 | Nan et al. |
| 2014/0328329 | A1 | 11/2014 | Novlan et al. |
| 2016/0242166 | A1 | 8/2016 | Nam et al. |
| 2019/0124609 | A1* | 4/2019 | Gheorghiu ............ H04W 56/00 |
| 2019/0363809 | A1* | 11/2019 | Yoon ..................... H04W 56/00 |
| 2020/0112989 | A1* | 4/2020 | Zeng ................. H04W 74/0825 |
| 2020/0178188 | A1* | 6/2020 | Zhao ................. H04W 72/0446 |
| 2021/0153146 | A1* | 5/2021 | Liu .......................... H04L 5/00 |
| 2021/0168740 | A1* | 6/2021 | Park ..................... H04W 56/00 |
| 2021/0321421 | A1* | 10/2021 | Osawa .................. H04W 72/10 |
| 2021/0400725 | A1* | 12/2021 | Harada ................. H04L 5/0051 |

OTHER PUBLICATIONS

Itl, 'Considerations on sidelink synchronization for NR V2X', R1-1813493, 3GPP TSG RAN WG1 Meeting #95, Nov. 3, 2018, Spokane, USA, sections 3-4; and figure 1.

Huawei et al., 'Sidelink synchronization mechanisms for NR V2X', R1-1812208, 3GPP TSG RAN WG1 Meeting #95, Nov. 3, 2018, Spokane, USA, sections 2.2.2, 2.3.

Nec, 'Synchronization mechanism for NR V2X', R1-1812650, 3GPP TSG RAN WG1 Meeting #95, Nov. 2, 2018, Spokane, USA, section 2.

LG Electronics, 'Discussion on sidelink synchronization for NR V2X', R1-1812843, 3GPP TSG RAN WG1 Meeting #95, Nov. 3, 2018, Spokane, USA, sections 2.1-2.2.

"3rd Generation Partnership Project; Technical Specification Group Radio Access Network; Evolved Universal Terrestrial Radio Access (E-UTRA); Radio Resource Control (RRC); Protocol specification (Release 15)", 3GPP Draft, R2-1809067 TS 36.331 Baseline CR for the UE Capabilities Almost Final, 3rd Generation Partnership Project (3GPP), May 5, 2018, XP051520403, May 11, 2022.

Extended European Search Report dated Dec. 3, 2021, issued in European Patent Application No. 20738655.8.

Indian Office Action dated Jan. 30, 2023, issued in Indian Patent Application No. 202137030924.

* cited by examiner

In-coverage scenario

Partial coverage scenario

Out-of-coverage scenario

Inter-cell V2X communication scenario

Unicast V2X communication

METHOD AND APPARATUS FOR TRANSMITTING SYNCHRONIZATION SIGNAL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0003505, filed on Jan. 10, 2019, in the Korean Intellectual Property Office, the disclosure of which is incorporated by reference herein in its entirety.

BACKGROUND

1. Field

The disclosure relates to a method for transmitting and receiving synchronization signals between a terminal and a terminal in a wireless communication system. More particularly, the disclosure relates to a method and an apparatus for transmitting a new radio (NR) sidelink synchronization signal in a long-term evolution (LTE) cell, a method and an apparatus for transmitting an LTE sidelink synchronization signal in an NR cell, or a method and an apparatus for transmitting an NR sidelink synchronization signal in an NR cell.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'. The 5G communication system is considered to be implemented in higher frequency (millimeter Wave (mmWave)) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid Frequency Shift Keying (FSK) and Quadrature Amplitude (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As described above, with the advancement of a mobile communication system, various services can be provided, and thus methods for effectively providing these services are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for transmitting an NR sidelink synchronization signal in an LTE cell and a method for transmitting an LTE sidelink synchronization signal in an NR cell.

Another aspect of the disclosure is to provide a method for transmitting a synchronization signal by a first terminal, the method including receiving, from a base station, first synchronization information for synchronization, determining second synchronization information based on the first synchronization information and a subcarrier spacing used for a sidelink between the first terminal and a second terminal, and transmitting the second synchronization information to the second terminal.

Additional aspects will be set forth in part in the description which follows and, in part, will be apparent from the description, or may be learned by practice of the presented embodiments.

In accordance with an aspect of the disclosure, a method for transmitting a synchronization signal by a first terminal in a wireless communication system supporting a sidelink between the first terminal and a second terminal is provided. The method includes receiving configuration information including a parameter for transmission of a synchronization signal block (SSB) from a base station, identifying a resource for transmission of the SSB based on the parameter, and in case that a condition for transmission of the SSB is satisfied, transmitting the SSB to a second terminal on the resource, wherein the parameter includes at least one piece of information among information on an offset, information on a transmission interval, or information on a number of times of transmission for transmission of the SSB.

In accordance with another aspect of the disclosure, a first terminal for transmitting a synchronization signal in a wireless communication system supporting a sidelink between the first terminal and a second terminal includes a transceiver, and at least one processor configured to receive configuration information including a parameter for transmission of a synchronization signal block (SSB) from a base station through the transceiver, identify a resource for transmission of the SSB based on the parameter, and in case that a condition for transmission of the SSB is satisfied through the transceiver, transmit the SSB to a second terminal on the resource, wherein the parameter includes at least one piece of information among information on an offset, information on a transmission interval, or information on a number of times of transmission for transmission of the SSB.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
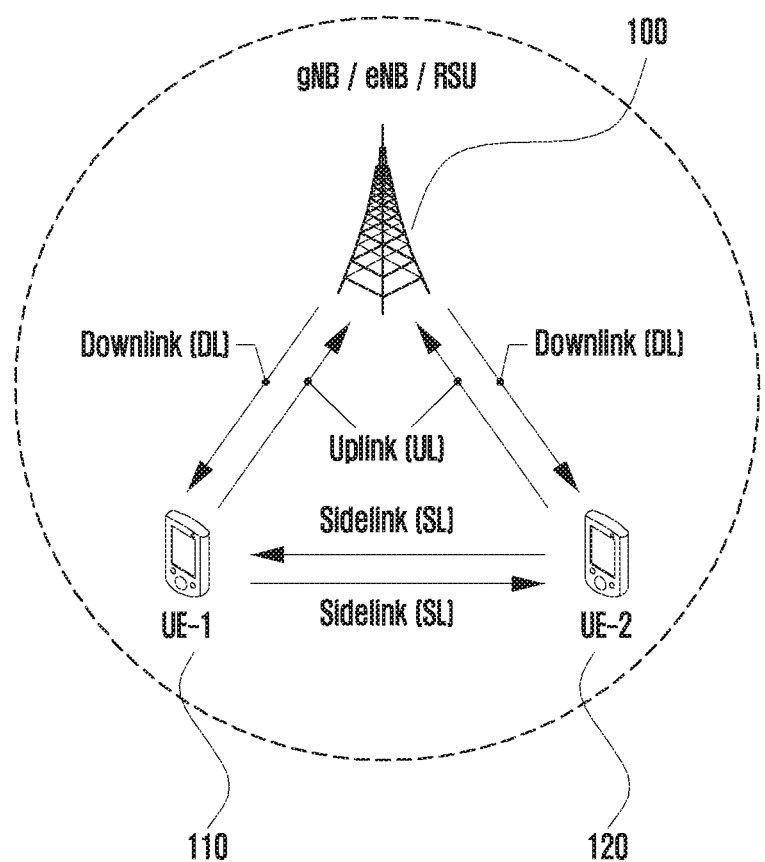
FIG. 1A illustrates an in-coverage scenario system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more such surfaces.

In describing embodiments of the disclosure, descriptions of technologies which are already known to those skilled in the art and are not directly related to the disclosure may be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and methods of achieving the same will be apparent by referring to embodiments of the disclosure as described below in conjunction with the accompanying drawings. However, the disclosure is not limited to the embodiments disclosed herein but may be implemented in various different forms. The following embodiments are provided only for completeness of the disclosure and completely informing those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Further, in embodiments of the disclosure, "~unit" may include at least one processor.

In describing embodiments of the disclosure, main objects of description are a wireless access network (i.e., a new RAN (NR)) and a packet core (a 5G system, a 5G core network, or a next-generation core (NG core)), which is a core network, in 5G mobile communication standards specified by the 3GPP which is a mobile communication standard standardization organization. However, the main subject matter of the disclosure may also be applied to other communication systems having similar technical backgrounds through partial modification without largely departing from the scope of the disclosure, and this application may be determined by those skilled in the art in the technical field of the disclosure.

In a 5G system, in order to support network automation, a network data collection and analysis function (i.e., a network data analytics function (NWDAF)), which is a network function of providing a result of analysis of data collected from a 5G network, may be defined. The NWDAF may collect/store/analyze information from a 5G network and provide an analysis result to an unspecified network function (NF), and the analysis result may be independently used by each NF.

Hereinafter, for convenience of description, some of terms and names defined by 3GPP standards (5G, NR, LTE, or a standard of a system similar thereto) may be used. However, the disclosure is not limited to the terms and names, and may be equally applied to systems complying with other standards.

Further, in the following description, the terms: for identifying access nodes, referring to network entities, referring to messages, referring to inter-network entity interfaces, and referring to various pieces of identification information are used by way of example for convenience of description. Therefore, the disclosure is not limited to the terms, and other terms referring to objects having equivalent technical meanings may be used.

In a communication system, multiple services may be provided to a user, and there is a need for a method capable of providing, in the same time period, the respective services so as to be suitable for characteristics thereof in order to provide the multiple services to the user, and an apparatus using the same. Research on various services provided in a 5G communication system is being conducted, and one of the various services is a service satisfying the requirements of low latency and high reliability.

In the case of vehicle communication, a standardization work for LTE-based V2X has been completed in 3GPP Rel-14 and Rel-15 based on a device-to-device (D2D) communication structure, and an effort to seek to develop V2X based on 5G NR is now in progress. NR V2X is supposed to support inter-terminal unicast communication, inter-terminal groupcast (or multicast) communication, and inter-terminal broadcast communication. Further, differently from LTE V2X, the purpose of which is to transmit or receive basic safety information necessary for a vehicle to drive on a road, NR V2X aims at providing more advanced services, such as platooning, advanced driving, extended sensor, and remote driving.

An NR V2X terminal may receive, from an NR base station, a synchronization signal and control information for NR V2X communication, and may perform NR V2X communication with another NR V2X terminal. This configuration may be defined as NR V2X terminal capability A. In addition to NR V2X terminal capability A, a particular NR V2X terminal may have capability to receive, from LTE base station, a synchronization signal or a synchronization signal and control information for NR V2X communication. This capability may be defined as NR V2X terminal capability B. In addition to the above-described NR V2X terminal capability B, another particular NR V2X terminal may have capability to perform LTE V2X communication with an LTE V2X terminal. According to these various capabilities of an NR V2X terminal, the particular V2X terminal may transmit a synchronization signal, control information, and data information for NR V2X communication in a coverage of an LTE base station. Further, the particular NR V2X terminal may transmit a synchronization signal, control information, and data information for LTE V2X communication in a coverage of an NR base station. In order to support this scenario, in NR V2X, there is a need for a method and an apparatus for transmitting a synchronization signal between terminals, which are different from legacy LTE D2D or legacy LTE V2X.

An embodiment of this specification is proposed to support the above-described scenario, and aims to provide a method and an apparatus for transmitting or receiving a synchronization signal between terminals.

Figure 1B:
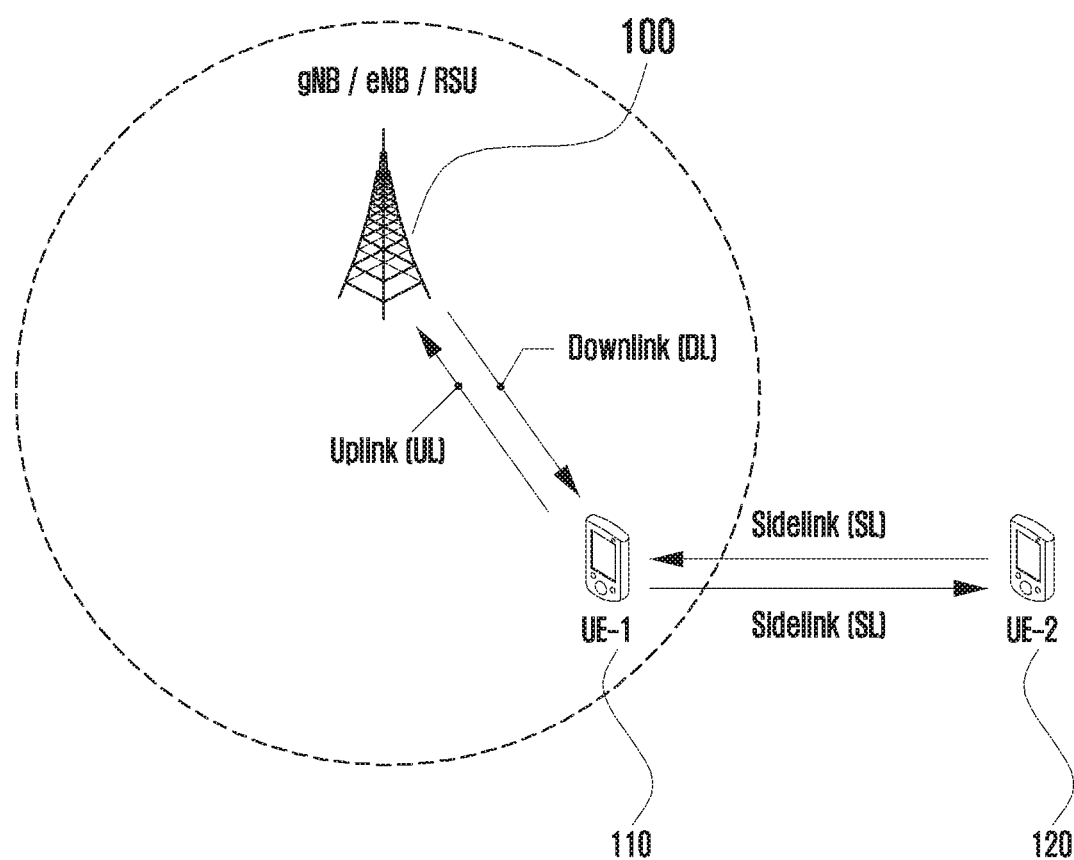
FIG. 1B illustrates a partial coverage scenario system according to an embodiment of the disclosure.
Figure 1C:
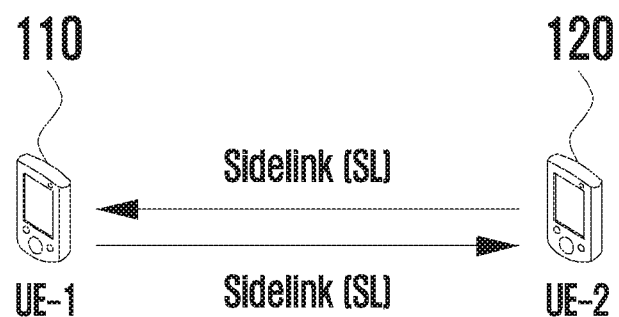
FIG. 1C illustrates an out-of-coverage scenario system according to an embodiment of the disclosure.
Figure 1D:
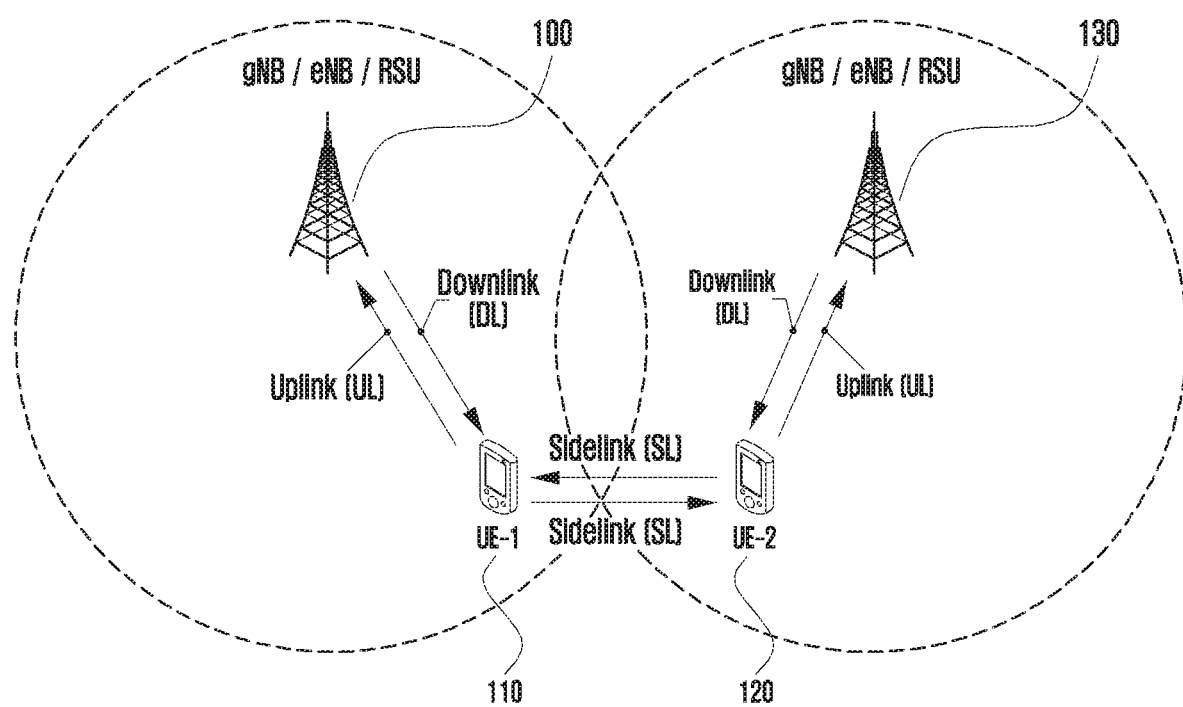
FIG. 1D illustrates an intra-cell vehicle-to-everything (V2X) communication scenario system according to an embodiment of the disclosure.

FIG. 1A illustrates a system according to an embodiment of the disclosure, FIG. 1B illustrates a system according to an embodiment of the disclosure, FIG. 1C illustrates a system according to an embodiment of the disclosure, and FIG. 1D illustrates a system according to an embodiment of the disclosure.

Referring to FIG. 1A, an example is illustrated in which all V2X UE-1 110 and UE-2 120 are located in a coverage of a base station 100.

All the V2X terminals may receive data and control information from the base station 100 in a downlink (DL), or may transmit data and control information to the base station 100 in an uplink (UL). In this example, data and control information may be data and control information for V2X communication. Alternatively, data and control information may be data and control information for typical cellular communication. Further, the V2X terminals may transmit/receive data and control information for V2X communication through a sidelink (SL).

Referring to FIG. 1B, an example is illustrated in which, among the V2X terminals, the UE-1 110 is located in the coverage of the base station 100 and the UE-2 120 is located out of the coverage of the base station 100. The example illustrated in FIG. 1B may be an example of a partial coverage.

The UE-1 110, located in the coverage of the base station 100, may receive data and control information from the base station 100 in a DL, or may transmit data and control information to the base station 100 in a UL.

The UE-2 120, located out of the coverage of the base station 100, may not receive data and control information from the base station 100 in a DL, and may not transmit data and control information to the base station 100 in a UL.

The UE-2 120 may transmit/receive data and control information for V2X communication to/from the UE-1 110 through an SL.

Referring to FIG. 1C, an example is illustrated in which all V2X terminals are located out of a coverage of a base station.

Accordingly, each of the UE-1 110 and the UE-2 120 may not receive data and control information from the base station in a DL, and may not transmit data and control information to the base station in a UL. The UE-1 110 may transmit/receive data and control information for V2X communication to/from the UE-2 120 through an SL.

Referring to FIG. 1D, an example is illustrated of a scenario in which V2X communication is performed between terminals located in different cells. Specifically, FIG. 1D illustrates a case in which a V2X transmission terminal and a V2X reception terminal are accessing different base stations (a radio resource control (RRC)-connected state) or are camping thereon (an RRC connection release state, i.e., an RRC idle state). In this example, the UE-1 110 may be a V2X transmission terminal, and the UE-2 120 may be a V2X reception terminal. Alternatively, the UE-1 110 may be a V2X reception terminal, and the UE-2 120 may be a V2X transmission terminal. The UE-1 110 may receive a V2X-dedicated system information block (SIB) from the base station 100 that the UE-1 110 itself is accessing (or is camping on). The UE-2 120 may receive a V2X-dedicated system information block (SIB) from another base station 130 that the UE-2 120 itself is accessing (or is camping on). In this example, information of the V2X-dedicated SIB received by the UE-1 110 may be different from information of the V2X-dedicated SIB received by the UE-2 120. Accordingly, in order to perform V2X communication between terminals located in different cells, it is necessary to standardize pieces of information.

Referring to each of FIGS. 1A, 1B, 1C, and 1D illustrates a V2X system including the two UE-1 and UE-2 for convenience of description, but the disclosure is not limited thereto. Further, a UL and a DL between the base station and the V2X terminals may be referred to as a "Uu interface", and an SL between the V2X terminals may be referred to as a "PC5 interface". Therefore, in the disclosure, a Uu interface and a PC5 interface may be used interchangeably with each other.

In the disclosure, a terminal may refer to a vehicle supporting vehicle-to-vehicle (V2V) communication, a vehicle supporting vehicle-to-pedestrian (V2P) communication or a pedestrian's handset (i.e., smart phone), a vehicle supporting vehicle-to-network (V2N) communication, or a vehicle supporting vehicle-to-infrastructure (V2I) communication. In addition, in the disclosure, a terminal may refer to a road side unit (RSU) having terminal functions, an RSU having base station functions, or an RSU having some of base station functions and some of terminal functions.

Further, in the disclosure, a base station may be pre-defined to be a base station supporting both V2X communication and typical cellular communication, or a base station supporting only V2X communication. In this configuration, the base station may refer to a 5G base station (gNB), a 4G base station (eNB), or an RSU. In the disclosure, unless specifically stated otherwise, a base station and an RSU may be used to refer to the same concept.

Figure 2A:
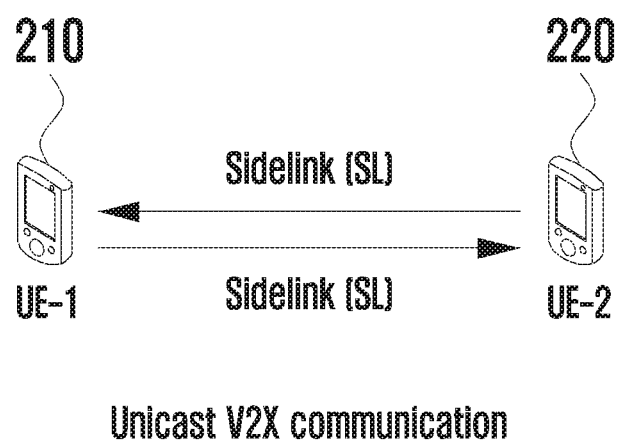
FIG. 2A illustrates a V2X communication method performed through a sidelink according to an embodiment of the disclosure.
Figure 2B:
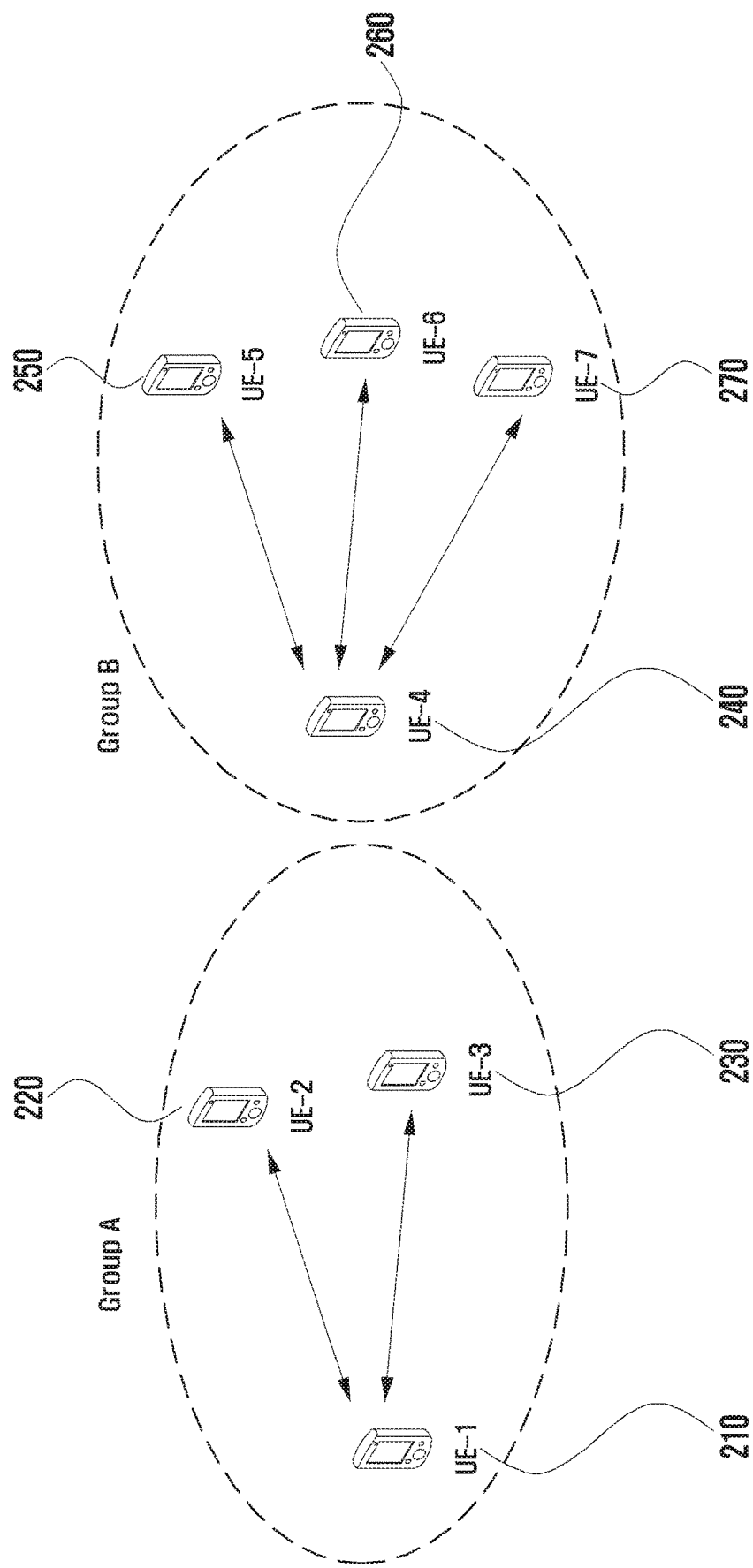
FIG. 2B illustrates a V2X communication method performed through a sidelink according to an embodiment of the disclosure.

FIG. 2A illustrates a V2X communication method performed through an SL according to an embodiment of the disclosure, and FIG. 2B illustrates a V2X communication method performed through an SL according to an embodiment of the disclosure.

Referring to FIG. 2A, a transmission (TX) terminal 210 and a reception (RX) terminal 220 may perform one-to-one communication with each other, and this configuration may be referred to as "unicast communication".

Referring to FIG. 2B, a TX terminal and an RX terminal may perform one-to-multiple communication, and this configuration is referred to as "groupcast" or "multicast".

FIG. 2B is a view illustrating an example in which UE-1 210, UE-2 220, and UE-3 230 configure one group A so as to perform groupcast communication, and UE-4 240, UE-5 250, UE-6 260, and UE-7 270 configure another group B so as to perform groupcast communication. Each terminal performs groupcast communication only in a group to which the terminal itself belongs, and communication between different groups is not performed. The two groups are illustrated as being configured in FIG. 2B, but the scope of the disclosure is not limited thereto.

Although not illustrated in FIG. 2A and FIG. 2B, the V2X terminals may perform broadcast communication. Broadcast communication refers to a case in which all V2X terminals receive data and control information transmitted by a V2X TX terminal through an SL. As an example, in FIG. 2B, when the UE-1 210 is assumed to be a TX terminal for broadcast, all the UE-2, UE-3, UE-4, UE-5, UE-6, and UE-7 may receive data and control information transmitted by the UE-1.

Figure 3:
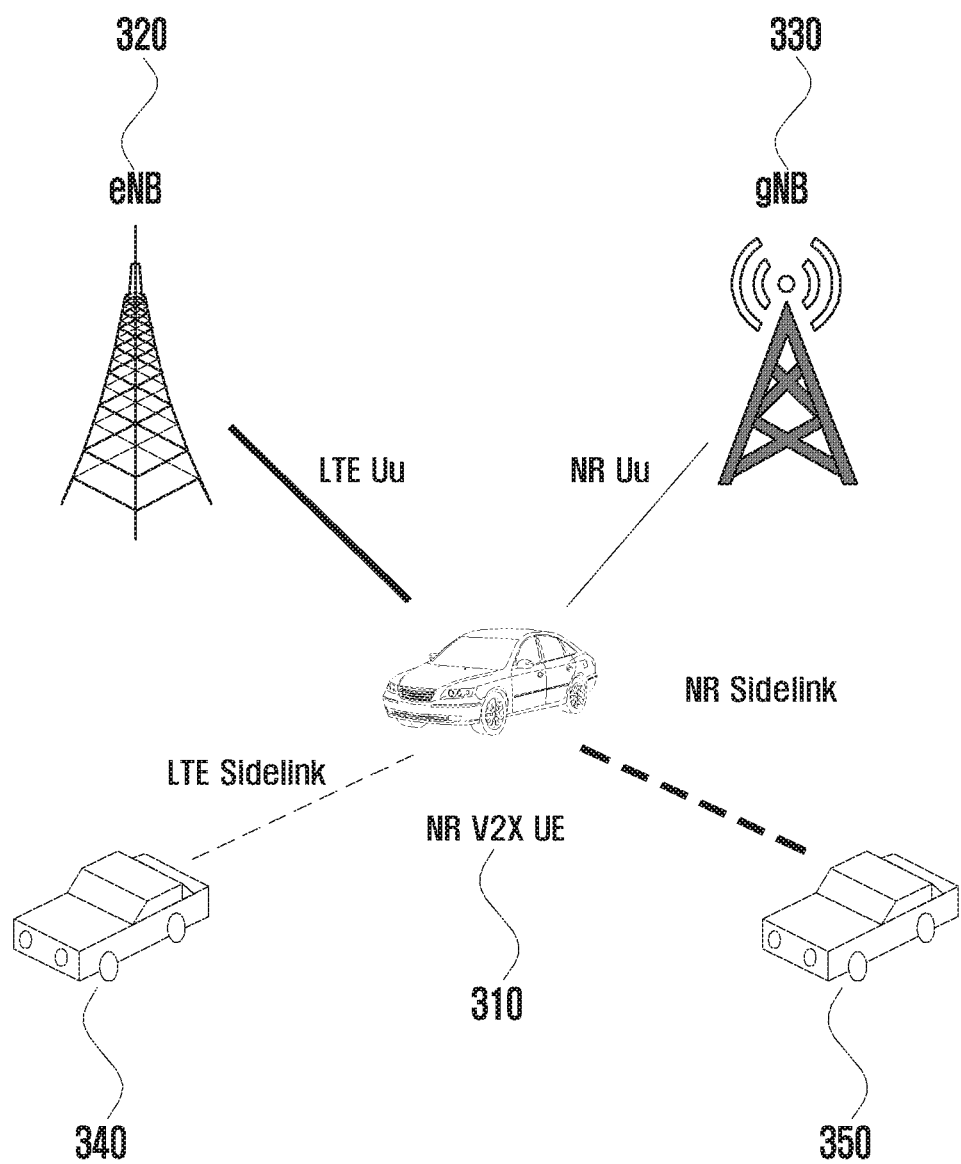
FIG. 3 is a view illustrating types of links, each of which allows an NR V2X terminal to perform V2X communication according to an embodiment of the disclosure.

FIG. 3 is a view illustrating types of links, each of which allows an NR V2X terminal to perform V2X communication according to an embodiment of the disclosure.

Referring to FIG. 3, specifically, V2X communication may be performed through at least one of the following links.

A link between an NR V2X terminal 310 and another NR V2X terminal 350 may be referred to as an "NR sidelink (SL)". The NR V2X terminal 310 may transmit SL control information and data information for NR V2X communication to another NR V2X terminal 350 through the NR SL. Further, the NR V2X terminal 310 may receive SL control information and data information for NR V2X communication from another NR V2X terminal 350 through the NR SL.

A link between the NR V2X terminal 310 and an LTE V2X terminal 340 may be referred to as an "LTE SL". In this example, it may be assumed that the NR V2X terminal 310 has capability to support LTE V2X communication. The NR V2X terminal 310 may transmit or receive control information and data information for LTE V2X communication through the LTE SL.

A DL or a UL between the NR V2X terminal 310 and an NR base station (gNB) 330 may be referred to as an "NR Uu".

The NR V2X terminal 310 may receive control information and data information on NR SL transmission and reception from the NR base station (gNB) 330 through the NR Uu. Further, the NR V2X terminal 310 may transmit NR SL control information and data information, received from another NR V2X terminal 350, to the gNB 330 through the NR Uu.

The NR V2X terminal 310 may receive control information and data information on LTE SL transmission and reception from the NR base station (gNB) 330 through the NR Uu. Further, the NR V2X terminal 310 may transmit LTE SL control information and data information, received from the LTE V2X terminal 340, to the gNB 330 through the NR Uu. In this example, it may be assumed that the NR V2X terminal 310 has capability to support LTE V2X communication.

A DL or a UL between the NR V2X terminal 310 and an LTE base station (eNB) 320 may be referred to as an "LTE Uu".

The NR V2X terminal 310 may receive control information and data information on NR SL transmission and reception from the LTE base station (eNB) 320 through the LTE Uu. Further, the NR V2X terminal 310 may transmit NR SL control information and data information, received from another NR V2X terminal 350, to the eNB 320 through the LTE Uu. In this example, it may be assumed that the NR V2X terminal 310 has capability to support the LTE Uu.

The NR V2X terminal 310 may receive control information and data information on LTE SL transmission and reception from the eNB 320 through the LTE Uu. Further, the NR V2X terminal 310 may transmit LTE SL control information and data information, received from the LTE V2X terminal 340, to the eNB 320 through the LTE Uu. In this example, it may be assumed that the NR V2X terminal 310 has capability to support LTE V2X communication and also has capability to support the LTE Uu.

The various links for NR V2X communication illustrated in FIG. 3 may be classified, according to capabilities of an NR V2X terminal, as follows:

Case 1) NR V2X terminal supporting an NR Uu and an NR SL,

Case 2) NR V2X terminal supporting an NR Uu, an NR SL, and an LTE Uu, and

Case 3) NR V2X terminal supporting an NR Uu, an NR SL, an LTE Uu, and an LTE SL.

Figure 4:
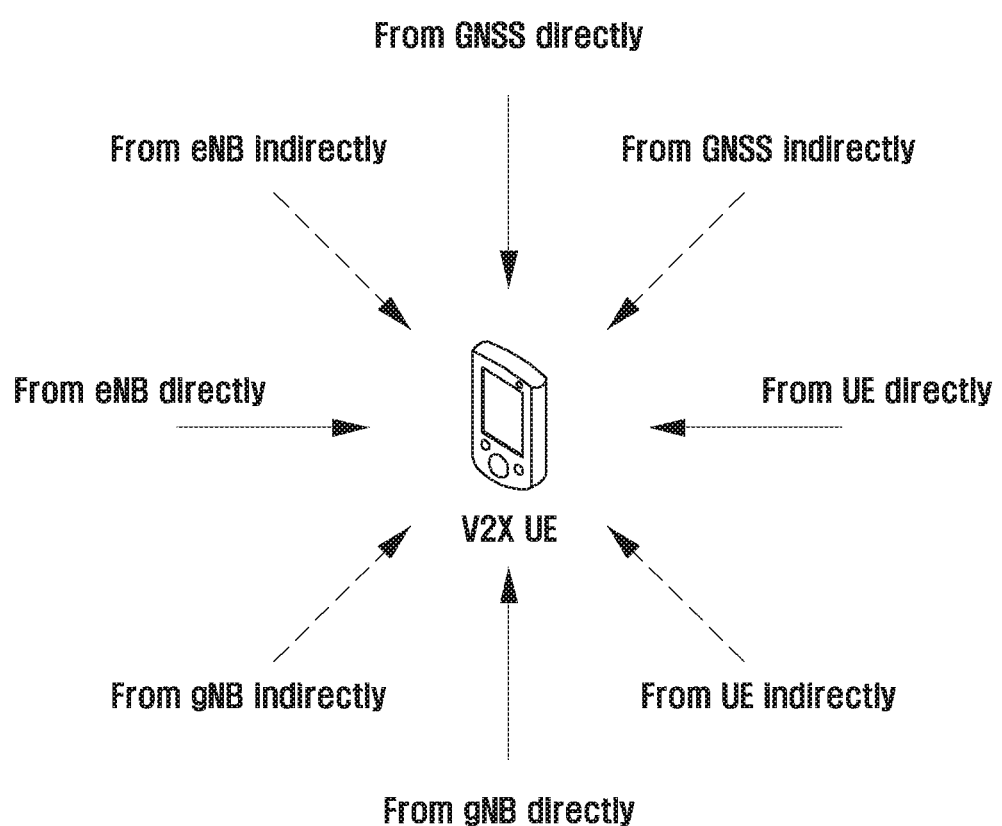
FIG. 4 is a view illustrating types of synchronization signals, each of which may be received by an NR V2X terminal according to an embodiment of the disclosure.

FIG. 4 is a view illustrating types of synchronization signals, each of which may be received by an NR V2X terminal according to an embodiment of the disclosure.

Referring to FIG. 4, the NR V2X terminal may perform time/frequency synchronization in order to perform NR V2X communication. To this end, the NR V2X terminal may receive synchronization signals from various synchronization signal sources as illustrated in FIG. 4. More specifically, The NR V2X terminal may directly or indirectly receive a synchronization signal from a global navigation satellite system (GNSS) or a global positioning system (GPS).

When the NR V2X terminal directly receives a synchronization signal from the GNSS, a synchronization signal source for the NR V2X terminal may be the GNSS.

When the NR V2X terminal indirectly receives a synchronization signal from the GNSS, the NR V2X UE-1 may be synchronized with another NR V2X UE-2 which keeps directly synchronized with the GNSS. In this example, another NR V2X UE-2 may transmit an NR sidelink synchronization signal (SLSS) to the NR V2X UE-1, and the NR V2X UE-1 may receive the NR SLSS so as to be synchronized with another NR V2X UE-2 with respect to time/frequency. As another example, the NR V2X terminal may be synchronized with an LTE V2X terminal which keeps directly synchronized with the GNSS. In this example, the LTE V2X terminal may transmit an LTE SLSS to the NR V2X terminal, and the NR V2X terminal having received the LTE SLSS may be synchronized with the LTE V2X terminal with respect to time/frequency. When the NR V2X terminal indirectly receives a synchronization signal from the GNSS, the NR V2X terminal may be considered to receive the synchronization signal of the GNSS over two hops (i.e., GNSS—NR V2X terminal—NR V2X terminal, or GNSS—LTE V2X terminal—NR V2X terminal). Similarly to this configuration, the NR V2X terminal may receive a synchronization signal from the GNSS over three hops or more.

The NR V2X terminal may directly or indirectly receive a synchronization signal from an LTE base station (eNB).

The NR V2X terminal may directly receive an LTE primary synchronization signal (PSS)/secondary synchronization signal (SSS) transmitted by the eNB. Alternatively, the NR V2X terminal may directly receive an LTE PSS/SSS and a physical broadcast channel (PBCH) transmitted by the eNB. As another example, the NR V2X terminal may directly receive an LTE PSS/SSS, a PBCH, and an LTE V2X system information block (SIB) for LTE V2X terminals, which are transmitted by the eNB. To this end, the NR V2X terminal may have capability to receive a corresponding signal or corresponding signals from the eNB. In the above-described example, a synchronization signal source for the NR V2X terminal may be the eNB.

The NR V2X terminal may indirectly receive a synchronization signal from the eNB. For example, the NR V2X UE-1 may be synchronized with another NR V2X UE-2 which keeps directly synchronized with the eNB. In this example, another NR V2X UE-2 may transmit an NR SLSS to the NR V2X UE-1, and the NR V2X UE-1 may receive the NR SLSS so as to be synchronized with another NR V2X UE-2 with respect to time/frequency. As another example, the NR V2X terminal may be synchronized with an LTE V2X terminal which keeps directly synchronized with the eNB. In this example, the LTE V2X terminal may transmit an LTE SLSS to the NR V2X terminal, and the NR V2X terminal having received the LTE SLSS may be synchronized with the LTE V2X terminal with respect to time/frequency. When the NR V2X terminal indirectly receives a synchronization signal from the eNB, the NR V2X terminal may be considered to receive the synchronization signal of the eNB over two hops (i.e., eNB—NR V2X terminal—NR V2X terminal, or eNB—LTE V2X terminal—NR V2X terminal). Similarly to this configuration, the NR V2X terminal may receive a synchronization signal from the eNB over three hops or more.

The NR V2X terminal may directly or indirectly receive a synchronization signal from an NR base station (gNB).

The NR V2X terminal may directly receive an NR PSS/SSS transmitted by the gNB. Alternatively, the NR V2X terminal may directly receive an NR PSS/SSS and an NR PBCH which are transmitted by the gNB. As another example, the NR V2X terminal may directly receive an NR PSS/SSS, an NR PBCH, and an NR V2X SIB for NR V2X terminals, which are transmitted by the gNB.

The NR V2X terminal may indirectly receive a synchronization signal from the gNB. For example, the NR V2X UE-1 may be synchronized with another NR V2X UE-2 which keeps directly synchronized with the gNB. In this example, another NR V2X UE-2 may transmit an NR SLSS to the NR V2X UE-1, and the NR V2X UE-1 may receive the NR SLSS so as to be synchronized with another NR V2X UE-2 with respect to time/frequency. As another example, the NR V2X terminal may be synchronized with an LTE V2X terminal which keeps directly synchronized with the gNB. In this example, the LTE V2X terminal may transmit an LTE SLSS to the NR V2X terminal, and the NR V2X terminal having received the LTE SLSS may be synchronized with the LTE V2X terminal with respect to time/frequency. When the NR V2X terminal indirectly receives a synchronization signal from the gNB, the NR V2X terminal may be considered to receive the synchronization signal of the gNB over two hops (i.e., gNB—NR V2X terminal—NR V2X terminal, or gNB—LTE V2X terminal—NR V2X terminal). Similarly to this configuration, the NR V2X terminal may receive a synchronization signal from the gNB over three hops or more.

An NR V2X UE-A may directly or indirectly receive a synchronization signal from another NR V2X UE-B or an LTE V2X terminal.

The NR V2X UE-B may transmit an NR sidelink synchronization signal block (S-SSB) based on a timing thereof. The NR V2X UE-A may directly receive an NR S-SSB transmitted by the NR V2X UE-B so as to be synchronized with the NR V2X UE-B. In this example, a synchronization signal source for an NR V2X terminal may be another NR V2X terminal. The LTE V2X terminal may transmit an LTE SLSS based on a timing thereof. The NR V2X terminal may directly receive an LTE SLSS transmitted by the LTE V2X terminal so as to be synchronized with the LTE V2X terminal. In this example, a synchronization signal source for an NR V2X terminal may be the LTE V2X terminal.

To indirectly receive a synchronization signal from a terminal by an NR V2X terminal may refer to a case in which the NR V2X UE-A is synchronized with an NR S-SSB transmitted by an NR V2X UE-1 which keeps directly synchronized with the NR V2X UE-B or the LTE V2X terminal. Similarly to this configuration, an NR V2X terminal may receive a synchronization signal from an NR V2X terminal or an LTE V2X terminal over three hops or more.

An SL synchronization signal mentioned in this specification may refer to an NR S-SSB or an LTE SLSS. An NR S-SSB may include a sidelink primary synchronization signal (S-PSS), a sidelink secondary synchronization signal (S-SSS), and a physical sidelink broadcast channel (PSBCH). In this example, an S-PSS may include a Zadoff-Chu sequence or an M-sequence, and an S-SSS may include an M-sequence or a gold sequence. Similarly to a PSS/SSS in an LTE cellular system, an SL ID may be transmitted through a combination of an S-PSS and an S-SSS, or through only an S-SSS which is not the combination thereof. A PSBCH may transmit a master information block (MIB) for SL communication, as in the case of a PBCH of a cellular system. In addition, an LTE SLSS may refer to a primary sidelink synchronization signal (PSSS)/secondary sidelink synchronization signal (SSSS), or may refer to both a PSSS/SSS and a PSBCH. Further, it is specified that an NR S-SSB may have the same meaning as that of an NR SLSS.

Figure 5:
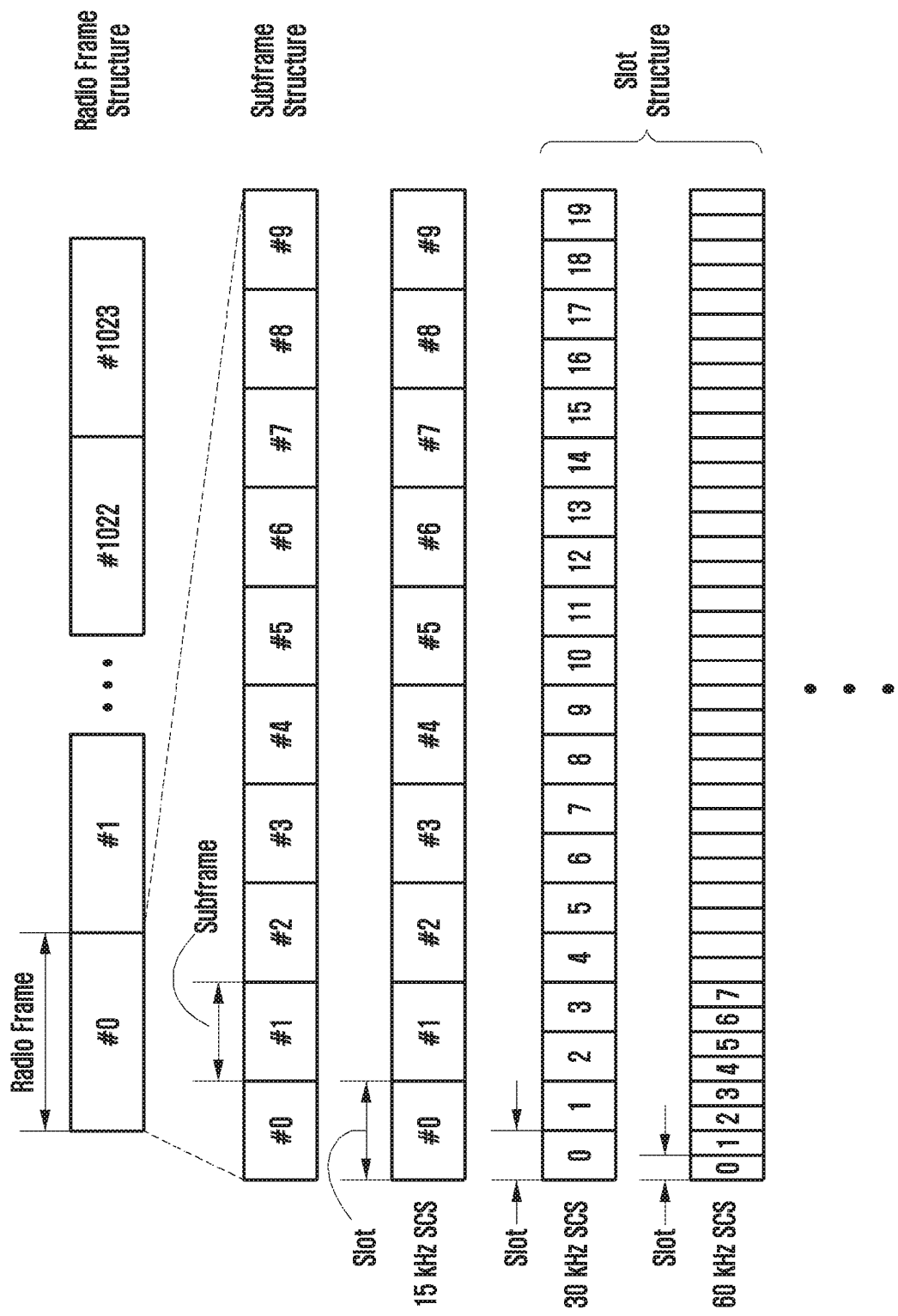
FIG. 5 illustrates a frame structure for NR V2X according to an embodiment of the disclosure.

FIG. 5 illustrates a frame structure for NR V2X according to an embodiment of the disclosure.

Referring to FIG. 5, an example is illustrated in which a system operates 1024 radio frames, but the disclosure is not limited thereto. For example, a particular system may operate radio frames, the number of is less or greater than 1024, and how many radio frames are to be operated by the system may be configured for a terminal by using a MIB transmitted by a base station through a PBCH, or may correspond to a fixed value pre-agreed upon with a terminal. In FIG. 5, a radio frame number and a system frame number may be treated identically. For example, a radio frame number of 0 may correspond to a system frame number of 0, and a radio frame number of 1 may correspond to a system frame number of 1. One radio frame may include 10 subframes, and one subframe may have a length of 1 ms on a time axis. As illustrated in FIG. 5, the number of slots substituting one subframe may change according to a subcarrier spacing used in NR V2X. For example, when a subcarrier spacing of 15 kHz is used for NR V2X communication, one subframe may be identical to one slot. In contrast, when a subcarrier spacing of 30 kHz is used for NR V2X communication, one subframe may be identical to two slots. When a subcarrier spacing of 60 kHz is used for NR V2X communication, one subframe may be identical to four slots. Although not illustrated in FIG. 5, this configuration may also be applied to a case in which a subcarrier spacing of 120 kHz or larger is used. For example, if the number of slots constituting one subframe is generalized, as a subcarrier spacing increases with reference to a subcarrier spacing of 15 kHz, the number of slots constituting one subframe may increase as expressed by $2^n$, and n=0, 1, 2, 3, . . . .

Figure 6:
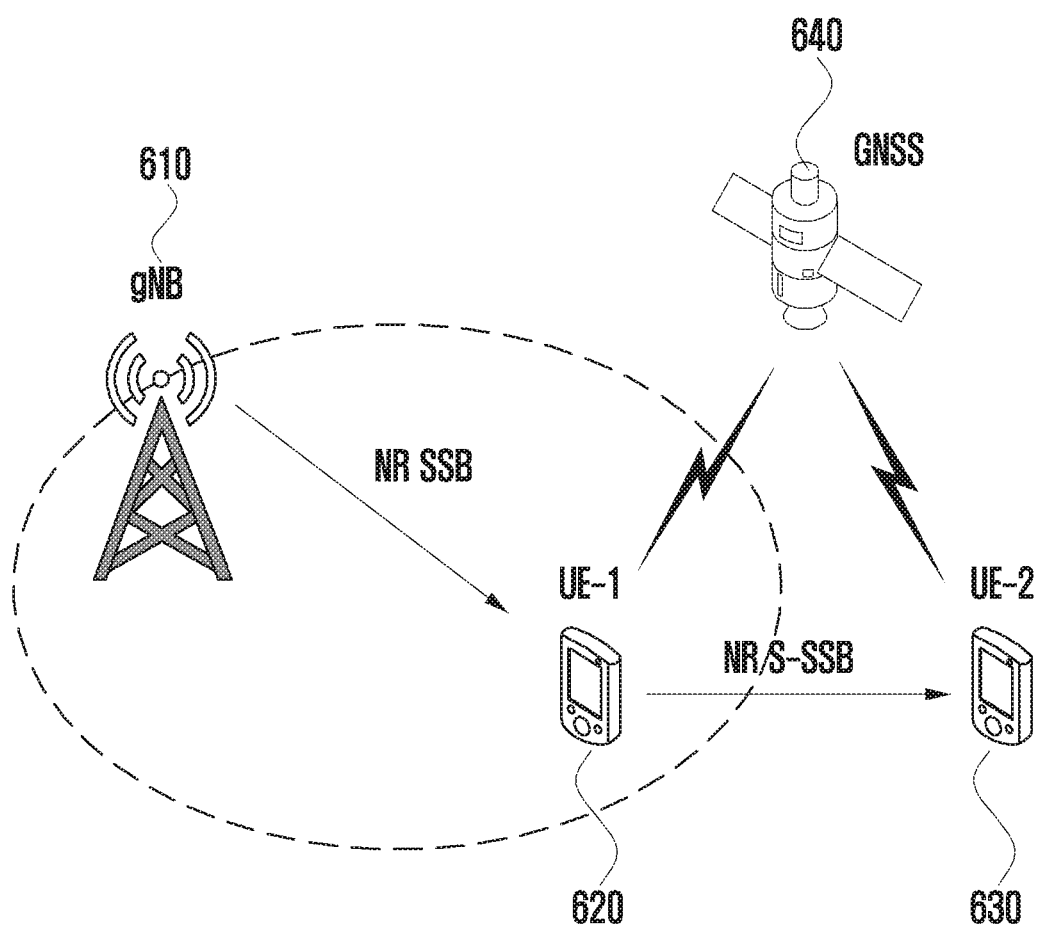
FIG. 6 illustrates an NR V2X synchronization procedure according to an embodiment of the disclosure.

FIG. 6 illustrates an NR V2X synchronization procedure according to an embodiment of the disclosure.

Referring to FIG. 6, an example is illustrated of an operation of an NR V2X terminal supporting Case 1) specified in FIG. 3. In this example, the NR V2X terminal supporting Case 1) may refer to a terminal capable of supporting NR V2X communication through the NR Uu and the NR SL illustrated in FIG. 3. In this example, the NR V2X terminal may refer to a terminal which does not support the LTE Uu and the LTE SL. However, embodiments are not limited thereto.

FIG. 6 illustrates an example in which a UE-1 620 is located in a coverage of a gNB 610 and a UE-2 630 is located out of the coverage thereof. Accordingly, FIG. 6 illustrates an example in which the UE-1 620 may receive and detect an NR SSB transmitted by the gNB 610 but the UE-2 630 may not receive and detect an NR SSB transmitted by the gNB 610.

If the UE-1 620 has capability to transmit an NR S-SSB, the UE-1 620 may transmit an NR S-SSB, for the UE-2 630 located out of the coverage of the gNB 610. For example, when the UE-1 620 is RRC-connected to the gNB 610 (RRC-connected mode), the gNB 610 may instruct the UE-1 620 to transmit an NR S-SSB through a dedicated RRC configuration.

Alternatively, when the UE-1 620 is not RRC-connected to the gNB 610 (RRC idle mode), the UE-1 620 may compare a reference signal received power (RSRP) value with a gNB measured by the UE-1 620 itself, with a threshold of RSRP configured by the gNB 610 through an NR V2X SIB. If the RSRP value measured by the UE-1 620 is less than the threshold of the RSRP configured by the gNB 610, the UE-1 620 may transmit an NR S-SSB. In this example, RSRP may be measured using an SSS of an NR SSB transmitted by the gNB 610 or using an SSS of an NR SSB and a DMRS of a PBCH which are transmitted by the gNB 610. Whether the UE-1 620 is to measure RSRP by using only an SSS or by using both an SSS and a DMRS of a PBCH may be determined by the UE-1 620 itself, or may comply with configuration by the gNB 610.

When the UE-1 620 itself determines an RSRP measurement method, the UE-1 620 needs to recognize whether transmission power of a DMRS of a PBCH is identical to that of an SSS. For example, when an SSS is transmitted with transmission power of X [dBm] and a DMRS of a PBCH is transmitted with transmission power obtained by increasing X [dBm] by Y [dB] (i.e., power boosting by Y[dB]) as compared with the SSS, if the terminal measures RSRP by using the SSS and the DMRS of the PBCH, the accuracy of measurement of the RSRP may be reduced due to different pieces of transmission power. Accordingly, the gNB may configure a transmission power value of a DMRS of a PBCH through an NR V2X SIB, may configure whether power boosting has been used to transmit a DMRS of a PBCH, and when the power boosting has been used, may use a fixed value pre-agreed between the terminal and the gNB, or may use a fixed value pre-agreed between the terminal and the gNB.

When the terminal determines the RSRP measurement method according to the configuration by the gNB, the gNB may configure, through an NR V2X SIB, whether RSRP should be measured using only an SSS or using both an SSS and a DMRS of a PBCH. In this example, as in the above-mentioned example, the gNB 610 may configure, through an NR V2X SIB, a transmission power value of a DMRS of a PBCH or whether power boosting is employed. As another example of measurement of RSRP, the UE-1 620 may use a channel state information reference signal (CSI-RS) transmitted by the gNB 610. The gNB 610 may configure, through an NR V2X SIB, whether the UE-1 620 is to measure RSRP by using an SSS and a DMRS of a PBCH or by using a CSI-RS.

A synchronization procedure for NR V2X communication may be as follows. The gNB 610 may configure, through an NR V2X SIB, whether NR V2X terminals located in the coverage of the gNB 610 itself should be synchronized with a GNSS 640 or should be synchronized through an NR SSB transmitted by the gNB 610 itself.

For example, when the UE-1 620 is configured to be synchronized with an NR SSB transmitted by the gNB 610, the UE-1 620 may be synchronized with the NR SSB, and may perform NR V2X communication. In this example, when the UE-1 620 transmits an NR S-SSB in the above-described conditions (e.g., when the terminal has capability to transmit an NR S-SSB, when the base station instructs the terminal to transmit an NR S-SSB, or when a measured RSRP value is less than an RSRP threshold configured by the gNB), the UE-1 620 may transmit an NR S-SSB based on a timing of the gNB. In this example, the transmission of an NR S-SSB based on the timing of the gNB implies that time/frequency of an NR S-SSB transmitted by the UE-1 620 is synchronized with an NR SSB transmitted by the gNB 610. More, specifically, the transmission of an NR S-SSB based on the timing of the gNB may imply that a direct frame number (DFN) of NR V2X is configured with reference to a system frame number (SFN) of the gNB 610.

For example, the UE-1 620 may use, as a DFN, SFN information acquired from a PBCH transmitted by the gNB 610, and the UE-1 620 may transmit DFN (i.e., SFN) information to the UE-2 630 through a PSBCH of an NR S-SSB transmitted by the UE-1 620 itself. The UE-2 630 may receive the DFN information, and thus perform system frame synchronization, subframe synchronization, slot synchronization, or symbol synchronization with the UE-1 620.

The UE-1 620 located in the coverage of the gNB 610 may receive information on a time resource of an NR S-SSB, which should be transmitted by the UE-1 620 itself, the information being configured by the gNB 610 through an NR V2X SIB. In this example, the information on the time resource of the NR S-SSB may include at least one of an offset of a subframe, an offset of a slot, or an offset of a symbol, a transmission cycle of the NR S-SSB, and a subcarrier spacing for transmission of the NR S-SSB. For example, the UE-1 620 may acquire information on a start point, at which an NR S-SSB can be first transmitted, using at least one piece of information among the above-described pieces of offset information, and may acquire information on how long time interval, when an NR S-SSB should be retransmitted, passes from the start point, through information on the transmission cycle of an NR S-SSB. The transmission cycle of an NR S-SSB may have a fixed value, or may be configured by the gNB 610 through an NR V2X SIB or UE-specific RRC. Further, the subcarrier spacing for an NR S-SSB may have a fixed value, or may be configured by the gNB 610 through an NR V2X SIB or UE-specific RRC.

When a subcarrier spacing is fixed, subcarrier spacings of an NR S-SSB are identical regardless of a carrier frequency at which NR V2X communication is performed, or may be different according to a carrier frequency. As an example in which subcarrier spacings of an NR S-SSB are different according to a carrier frequency, when a carrier frequency is f1, 30 kHz may be used as a subcarrier spacing, and when a carrier frequency is f2, 60 kHz may be used as a subcarrier spacing.

In order to increase a transmission coverage of an NR S-SSB, the number of times of repetitive transmission may be included as information on a time resource of an NR S-SSB. In this example, information on a time resource of an NR S-SSB may include offset information notifying of a start point of transmission of an NR S-SSB, a cycle of transmission of an NR S-SSB, and the number of times of repetitive transmission of an NR S-SSB in the cycle. In this example, the number of times of repetitive transmission may be fixed according to a carrier frequency, or may be configured by the gNB through an NR V2X SIB or UE-specific RRC. A repetitively-transmitted NR S-SSB may be transmitted on the same beam or different beams.

When information on a time resource of an NR S-SSB includes an offset of a subframe, the gNB 610 may configure, for the UE-1 620, a start time point of a subframe in which an NR S-SSB can be first transmitted with reference to SFN 0 of the gNB 610 itself. For example, when an offset of a subframe is configured to be "2", the UE-1 620 may recognize that transmission of an NR S-SSB should be started in a second subframe of system frame #0 of the gNB 610. When a subcarrier spacing for an NR SL is not 15 kHz as illustrated in FIG. 5, one subframe may include two or more slots. In this example, when the gNB 610 configures only an offset of a subframe, the UE-1 620 may not recognize that in which slot of a subframe the UE-1 620 should start transmission of an NR S-SSB. Accordingly, when only offset information of a subframe is configured through an NR V2X SIB, it is necessary to fix the position of a slot in which an NR S-SSB is transmitted in a subframe. For example, an NR S-SSB may be transmitted in a first slot. Therefore, according to the above-described example, when an offset of a subframe is configured to be "2", the UE-1 620 may start transmission of an NR S-SSB in a first slot existing in a second subframe of system frame #0 of the gNB 610. However, embodiments are not limited thereto. For example, for a terminal, a base station may also configure (through a SIB or RRC signaling) information on a position a slot (or an offset a slot) in which an NR S-SSB is transmitted, and in this case, a fixed position may not be used.

When information on a time resource of an NR S-SSB includes an offset of a slot, the gNB 610 may configure, for the UE-1 620, a slot in which transmission of an NR S-SSB can be started with reference to SFN 0 of the gNB 610 itself.

For example, when an offset of a slot is configured to be "X", the 620 may start transmission of an NR S-SSB in an X-th slot of system frame #0 of the gNB 610. For example, when a subcarrier spacing is assumed to be 120 kHz, one subframe may include eight slots. The position of a slot, in which an NR S-SSB can be first transmitted, may be one of 1024×10×8. Accordingly, information of 17 bits may be necessary to express this configuration. This case may imply that transmission of an NR S-SSB is not started in a fixed slot of a subframe but can be started in any slot thereof.

When information on a time resource of an NR S-SSB includes an offset of a symbol, the gNB 610 may configure, for the UE-1 620, a start point of a symbol on which an NR S-SSB can be transmitted with reference to SFN 0 of the gNB 610 itself. One slot may include 14 symbols, and there may exist a case in which an NR S-SSB has symbols the number of which is less than 14 (e.g., has four symbols). In this case, one entire slot may not be used to transmit an NR S-SSB, and thus when it is assumed that an NR S-SSB can be transmitted at any symbol position, information on a start point of a symbol for transmission of an NR S-SSB may be necessary.

When a start point of a symbol for transmission of an NR S-SSB is fixed in a slot (e.g., transmission of an NR S-SSB is started on a first symbol in a slot), a start point of transmission of an NR S-SSB through an offset of a slot may be configured without information on an offset of a symbol.

As another example, when a slot and a symbol for transmission of an NR S-SSB are fixed (e.g., transmission of an NR S-SSB is started on a first symbol in a first slot), a start point of transmission of an NR S-SSB may be configured through an offset of a subframe without information on an offset of a symbol and an offset of a slot.

When the gNB 610 performs configuration through an NR V2X SIB or UE-specific RRC so that a terminal can be synchronized with the GNSS 640 or when a parameter for issuing the order to be synchronized with a particular synchronization signal source (e.g., a gNB or an eNB) is not separately configured for an NR V2X SIB, if a GNSS synchronization signal can provide sufficiently high reliability, the UE-1 620 may be synchronized with the GNSS 640, and thus perform NR V2X communication. In this example, when the UE-1 620 transmits an NR S-SSB in the above-described conditions (e.g., when the UE-1 620 has capability to transmit an NR S-SSB, when the base station issues the order to transmit an NR S-SSB, or when a measured RSRP value is less than an RSRP threshold configured by the gNB), the UE-1 620 may transmit an NR S-SSB based on a timing of the GNSS. In this example, the gNB 610 may transmit information on a difference (DFN timing offset) between the timing of the GNSS and a timing of the gNB 610 to the UE-1 620 through an NR V2X SIB. The UE-1 620 having received the information on the difference may generate DFN information and a subframe number as expressed in Equation 1 below, and may transmit the DFN information and the subframe number to the UE-2 630 through a PSBCH of an NR S-SSB.

$$DFN = \text{floor}(0.1 \times (T_{current} - T_{ref} - \text{offsetDFN})) \bmod 1024$$

$$\text{Subframe number} = \text{floor}(T_{current} - T_{ref} - \text{offsetDFN}) \bmod 10 \quad \text{Equation 1}$$

In Equation 1, $T_{current}$ represents current universal time coordinated (UTC) acquired from the GNSS by the UE-1 620, and may have units of milliseconds (ms). $T_{ref}$ represents reference UTC, the reference of which is 00 seconds 00 minutes 00 hours of Jan. 1, 1900 in a Gregorian calendar, and may have units of milliseconds (ms). offsetDPN represents offset information on the difference between a timing of a GNSS and a timing of a gNB, and may have units of milliseconds (ms). In Equation 1, "mod" may represent the modulo operation, and "floor" may represent the floor function.

The UE-1 620 may transmit information on the DFN and the subframe number, which are calculated by Equation 1, to the UE-2 630 through a PSBCH of an NR S-SSB transmitted by the UE-1 620 itself. However, as illustrated in FIG. 5, an NR S-SSB may be transmitted not in a subframe unit but in a slot unit. In this example, the UE-1 620 may calculate a slot number by using Equation 2 below, and may transmit the slot number to the UE-2 630 through a PSBCH of an NR S-SSB. Equation 2 below is only an example of a method for calculating a slot number in the disclosure, and a slot number may be determined based on at least one of schemes (or information on whether to receive a system subframe number) for notifying of a value and an offset determined according to a subcarrier.

$$\text{Subframe number} = \text{floor}(T_{current} - T_{ref} - \text{offsetDFN}) \bmod 2^n \times M \quad \text{Equation 2}$$

In Equation 2, n's may have integer values of 0, 1, 2, 3 . . . , and for example, a subcarrier of 15 kHz may imply that n=0, and subcarriers of 30 kHz, 60 kHz, and 120 kHz may imply that n=1, n=2, and n=3, respectively. The value of n is only an example of the disclosure, and may be configured differently according to a subcarrier. For example, in Equation 2, the UE-1 may acquire information on n from the gNB 610 through an NR V2X SIB or UE-specific RRC configuration.

As another example, information on n may be pre-configured. In this example, the pre-configuration of the information on n may refer to a value embedded in a terminal.

As still another example, an n value may have an association relationship with a carrier frequency at which NR V2X communication is performed. More specifically, if NR V2X communication is performed at a frequency f1, it may imply that n=0, and if NR V2X communication is performed at a frequency f2, it may imply that n=1. In this example, the UE-1 620 may receive information on a carrier, through which an NR S-SSB should be transmitted by the UE-1 620 itself, the information being configured by the gNB 610 through an NR V2X SIB or UE-specific RRC. Alternatively, the information on the carrier used by the UE-1 620 to transmit an NR S-SSB may be preconfigured (e.g., may be embedded in the UE-1 620).

In Equation 2, M may have a predetermined value (e.g., 1 or 10) according to a scheme for notifying of an offset. As an example, the slot number calculated by Equation 2, together with the DFN and the subframe number calculated by Equation 1, may be transmitted to the UE-2 630 through a PSBCH of an NR S-SSB. In this example, M may be configured to be 1.

As another example, the DFN calculated by Equation 1 and the slot number calculated by Equation 2 may be transmitted to the UE-2 630 through a PSBCH of an NR S-SSB. In this example, a subframe number in Equation 1 may not be transmitted to the UE-2 630, and in this configuration, M may be configured to be 10 in Equation 2. In Equation 2, "mod" may represent the modulo operation, and "floor" may represent the floor function.

An NR S-SSB is not transmitted in a slot unit, but may be transmitted in a symbol unit. Specifically, when one slot is assumed to include 14 symbols, an NR S-SSB is transmitted not on all the 14 symbols, but may be transmitted on some symbols in a slot. For example, an NR S-SSB may be transmitted on four symbols among the 14 symbols. In this example, the UE-1 620 may use Equation 3 below to calculate a start point of a symbol on which an NR S-SSB is transmitted, and may transmit the calculated symbol number to the UE-2 630 through a PSBCH. Equation 3 below is only an example of a method for calculating a symbol number in the disclosure, and a symbol number may be determined using various methods based on the number of symbols.

$$\text{Symbol number} = \text{floor } (T_{current} - T_{ref} - \text{offsetDFN}) \bmod K \quad \text{Equation 3}$$

In Equation 3, K may represent the number of symbols constituting an NR S-SSB. In this example, the UE-1 620 may calculate a symbol number by using Equation 3, and the symbol number, together with the DFN and the subframe number calculated by Equation 1, may be transmitted to the UE-2 630 through a PSBCH of an NR S-SSB. As another example, the DFN calculated by Equation 1, the slot number calculated by Equation 2, and the symbol number calculated by Equation 3 may be transmitted to the UE-2 630 through a PSBCH of an NR S-SSB. In this example, the subframe number calculated by Equation 1 may not be transmitted to the UE-2 630 through a PSBCH of an NR S-SSB. In Equation 3, "mod" may represent the modulo operation, and "floor" may represent the floor function.

When the UE-1 620 does not receive offsetDFN information from the gNB 610 through an NR V2X SIB or UE-specific RRC configuration (i.e., when offsetDFN information is not configured for an NR V2X SIB or a UE-specific RRC parameter), the UE-1 620 may regard the value of offsetDFN as 0, and may perform calculation as expressed in Equation 1, Equation 2, and Equation 3. Then, the UE-1 620 may transmit a calculation result to the UE-2 630 through a PSBCH.

In the above-described examples, the UE-1 620 transmits an NR S-SSB to the UE-2 630, and thus it may be considered that the NR S-SSB is unicast-transmitted. However, the UE-1 620 located in the coverage of the gNB 610 may transmit, in a groupcast or broadcast manner, an NR S-SSB to one or more terminals located out of the coverage of the gNB 610.

In the above-described examples, the reference of a subframe offset, a slot offset, or a symbol offset has been described as SFN 0, but the scope of the disclosure is not limited thereto. For example, the offsets may be calculated with reference to the SFN "X", and the value of "X" may be a predefined value or a value configured by the gNB through an NR V2X SIB or UE-specific RRC.

Figure 7:
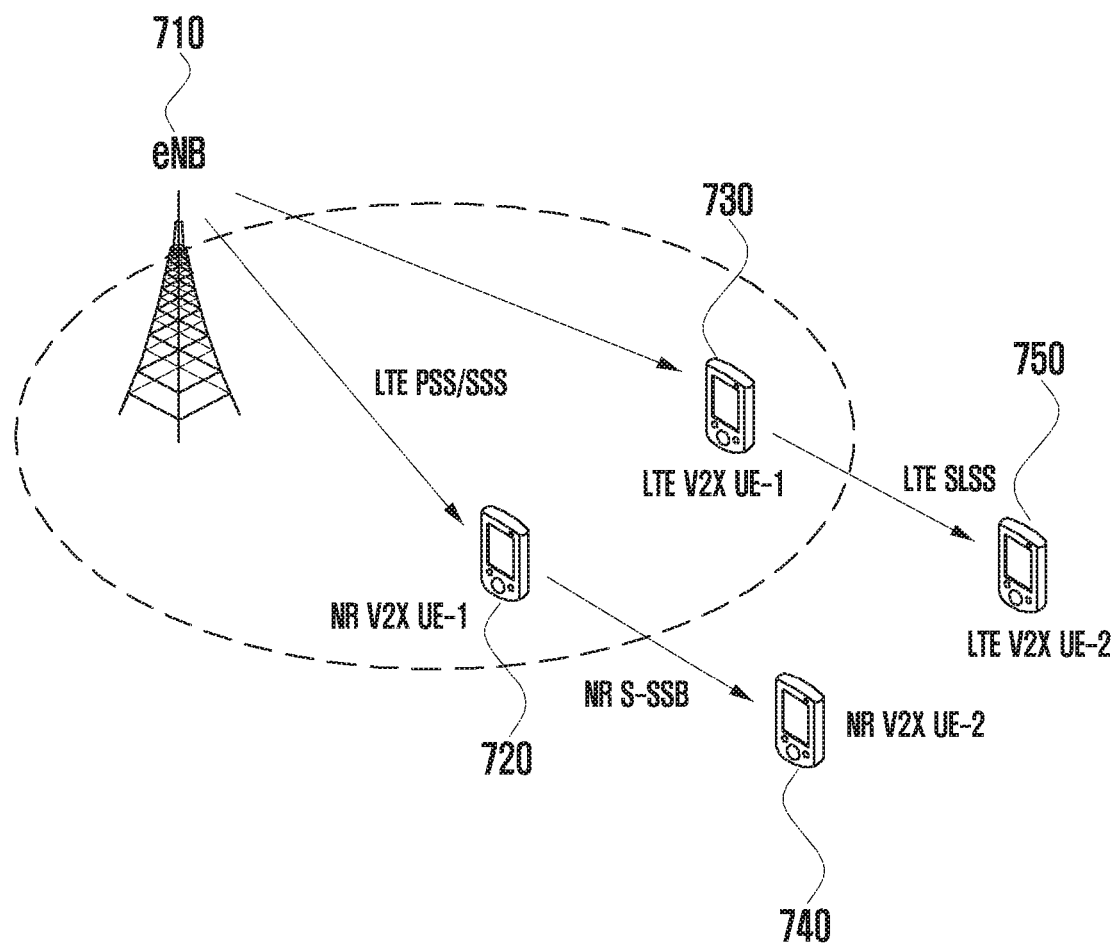
FIG. 7 illustrates an NR V2X synchronization procedure according to an embodiment of the disclosure.

FIG. 7 illustrates an NR V2X synchronization procedure according to an embodiment of the disclosure.

Referring to FIG. 7, an example is illustrated of an operation of an NR V2X terminal supporting Case 2) specified in FIG. 3. In this example, the NR V2X terminal supporting Case 2) may refer to a terminal capable of supporting NR V2X communication through the NR Uu, the NR SL, and the LTE Uu as illustrated in FIG. 3. FIG. 7 illustrates an example in which: an NR V2X UE-1 720 and an LTE V2X UE-1 730 are located in a coverage of an eNB 710, and an NR V2X UE-2 740 and an LTE V2X UE-2 750 are located out of the coverage of the eNB 710.

In this example: the NR V2X UE-1 720 and the LTE V2X UE-1 730 are located in the coverage of the eNB 710, and thus may detect and receive an LTE PSS/SSS transmitted by the eNB 710, but the NR V2X UE-2 740 and the LTE V2X UE-2 750 are located out of the coverage of the eNB 710, and thus may not detect and receive an LTE PSS/SSS transmitted by the eNB 710. In FIG. 7, it may be assumed that the NR V2X UE-1 720 located in the coverage of the eNB 710 selects the eNB 710 as a synchronization signal source by a determined rule. Further, it may be assumed that the NR V2X UE-1 720 has capability to transmit an NR S-SSB.

Differently from FIG. 6, FIG. 7 illustrates a case in which the NR V2X terminal is located in the coverage of the eNB and is to transmit an NR S-SSB in the coverage of the eNB. A subcarrier spacing and a waveform used to transmit an NR S-SSB may be different from a subcarrier spacing and a waveform used in an LTE system. For example, a terminal performing LTE V2X communication and a terminal performing LTE communication in the coverage of the eNB may use a subcarrier spacing of 15 kHz, and may use discrete Fourier transform spread orthogonal frequency division multiplexing (DFT-S-OFDM) as a waveform. In contrast, an NR S-SSB may use one of subcarrier spacings of 15 kHz, 30 kHz, 60 kHz, and 120 kHz, and may use, as a waveform, cyclic prefix orthogonal frequency division multiplexing (CP-OFDM) or DFT-S-OFDM. For example, as described above, an NR V2X communication system has a high freedom degree of parameter configuration differently from an LTE V2X communication system. Accordingly, which parameter is used by the NR V2X UE-1 720 to transmit an NR S-SSB in the coverage of the eNB may cause a change in the amount of interference affecting a terminal performing LTE V2X communication and a terminal performing LTE communication in the coverage of the eNB. Accordingly, the NR V2X UE-1 720 needs control by the eNB 710 to transmit an NR S-SSB, and in this configuration, it may be necessary to establish transmission of control information by the eNB and an operation of a terminal.

In the following examples, it may be assumed that NR V2X terminals located in the coverage of the eNB selects the eNB as a synchronization signal source. Further, this configuration may imply that each of the NR V2X terminals has capability to detect an LTE PSS/SSS which is a synchronization signal of the eNB (Alt1).

As another example, NR V2X terminals having selected the eNB as a synchronization signal source may imply that each of the NR V2X terminals has capability to detect an LTE PSS/SSS and decode an LTE PBCH (Alt2). As still another example, NR V2X terminals having selected the eNB as a synchronization signal source may imply that each of the NR V2X terminals is capable of detecting an LTE PSS/SSS, decoding an LTE PBCH, and further decoding LTE V2X SIB information configured for an LTE V2X terminal (Alt3).

As yet another example, each of NR V2X terminals having selected the eNB as a synchronization signal source is capable of detecting an LTE PSS/SSS, decoding an LTE PBCH, and decoding LTE V2X SIB information configured for an LTE V2X terminal. Further, this configuration may imply that an NR V2X terminal is capable of establishing an RRC connection with the eNB (Alt4).

On these various assumptions, in order to transmit an NR S-SSB or transmit control information and data information for NR V2X communication in the coverage of the eNB, an NR V2X terminal may perform one of the following operations.

Alt1: The NR V2X terminal may detect only an LTE PSS/SSS transmitted by the eNB.

The NR V2X terminal may detect an LTE PSS/SSS, and thus may acquire information on a subframe timing.

If the NR V2X terminal has capability to transmit an NR S-SSB, the NR V2X terminal may transmit an NR S-SSB based on the acquired subframe timing. In this example, pre-configured parameters may be used as parameters for transmission of an NR S-SSB. For example, the pre-configured parameters may include at least one of a subcarrier spacing, a waveform, a CP length, a time/frequency resource for transmission of an NR S-SSB, transmission power of an NR S-SSB, a DFN, a subframe number, a slot number, a symbol number, and identifiers of synchronization signal sources transmitted using an S-SSS or a PSBCH. In this example, a parameter pre-configured for transmission of an NR S-SSB may refer to values previously input to the NR V2X terminal. As another example, a parameter pre-configured (or predefined) for transmission of an NR S-SSB may refer to a parameter configured by a gNB through RRC when the NR V2X terminal configures an RRC connection with the gNB. Which synchronization signal source identifier is to be used by the NR V2X UE-1 may be determined using one of the following methods.

The NR V2X UE-1 may perform optional selection from synchronization signal source identifier groups predefined for NR V2X terminals located out of a coverage of the gNB.

The NR V2X UE-1 may perform optional selection from synchronization signal source identifier groups predefined for NR V2X terminals located out of the coverage of the gNB but located in the coverage of the eNB.

A cell ID of the eNB detected through an LTE PSS/SSS may be used as an identifier of a synchronization signal source for the NR V2X UE-1.

An NR V2X terminal which does not have capability to transmit an NR S-SSB may transmit NR V2X control information and data information based on the acquired subframe timing, or may receive NR V2X control information and data information, transmitted by another terminal, based on the acquired subframe timing. In this example, pre-configured parameters may be used as parameters for transmission of NR V2X control information and data information. For example, the pre-configured parameters may include a subcarrier spacing, a waveform, a CP length, a time/frequency resource for transmission of NR V2X control information and data information, transmission power, and the like. A parameter pre-configured for transmission of NR V2X control information and data information may refer to values previously input to the NR V2X terminal. As another example, a parameter pre-configured for transmission of NR V2X control information and data information may refer to a parameter configured by the gNB through RRC when the NR V2X terminal configures an RRC connection with the gNB.

In the above-described Alt1, the eNB may not control the transmission of an NR S-SSB by an NR V2X terminal located in a cell of the eNB itself, or the transmission of NR V2X control information and data information by the NR V2X terminal. Since NR V2X can use a subcarrier spacing and a waveform different from those of the LTE system, when control of NR V2X communication is not performed in the coverage of an eNB base station, unnecessary interference to the LTE system may be caused. Further, the NR V2X terminal having capability to transmit an NR S-SSB should always transmit an NR S-SSB regardless of a distance from the eNB, and thus may cause unnecessary power consumption. For example, in the case of Alt1, if an NR V2X terminal close to the eNB has capability to transmit an NR S-SSB, the NR V2X terminal may transmit an NR S-SSB. In this example, an NR S-SSB transmitted by an NR V2X terminal located in the coverage of the eNB may not arrive at an NR V2X terminal located out of the coverage of the eNB. Therefore, unnecessary transmission of an NR S-SSB may occur. In order to address these issues, the following methods may be considered.

Among NR V2X terminals having capability to transmit an NR S-SSB in the coverage of the eNB, only terminals, each of which has a history of reception of an SL synchronization signal (NR S-SSB) from the gNB or another NR V2X terminal, may transmit an NR S-SSB. More specifically, only NR V2X terminals, each of which takes a predetermined value or a value configured by a base station (X ms) or less until receiving an LTE PSS/SSS currently transmitted by the eNB from when an NR SSB transmitted by the gNB has been received, may transmit an NR S-SSB in the coverage of the eNB. In this configuration, for example, X ms may be determined based on the time required by the NR V2X terminal to leave the coverage of the gNB and enter the coverage of the eNB. For example, if the value of X is small, it means that the time required by the NR V2X terminal to leave the coverage of the gNB and enter the coverage of the eNB is short, and this situation may mean that the NR V2X terminal is located on the edge of the coverage of the eNB. Accordingly, transmission of an NR S-SSB may be limited so that NR V2X terminals, located on the edge of the coverage of the eNB, transmit an NR S-SSB. By this configuration, it is possible to reduce unnecessary power consumption of a terminal which is generated when an NR V2X terminal located out of the coverage of the eNB fails to receive an NR S-SSB transmitted by an NR V2X terminal located inside the coverage of the eNB. For the same reason as that for this configuration, transmission of an NR S-SSB may be limited so that only terminals, each of which has a history of reception of an SL synchronization signal (NR S-SSB) from another NR V2X terminal, transmit an NR S-SSB in the coverage of the eNB. In the above-described examples, the description focuses on the transmission of an NR S-SSB, but the above-described configuration may be identically applied to a case in which an NR V2X terminal transmits control information and data information for NR V2X communication in the coverage of the eNB.

Alt2: The NR V2X terminal may detect an LTE PSS/SSS transmitted by the eNB, and may decode an LTE PBCH transmitted by the eNB.

The NR V2X terminal may detect an LTE PSS/SSS, and thus may acquire information on a subframe timing. Further, the NR V2X terminal may decode an LTE PBCH, and thus may acquire information on an SFN.

When the NR V2X terminal has capability to transmit an NR S-SSB, the NR V2X terminal may transmit an NR S-SSB based on the acquired subframe timing information and SFN information. In this example, parameters pre-configured may be used as parameters for transmission of an NR S-SSB. However, Alt2 differs from Alt1 in that in Alt2, information on an SFN is acquired by decoding an LTE PBCH and thus may be used for a DFN. Accordingly, parameters pre-configured for transmission of an NR S-SSB in Alt2 may include at least one of a subcarrier spacing, a waveform, a CP length, a time/frequency resource for transmission of an NR S-SSB, transmission power of an NR S-SSB, a subframe number, a slot number, a symbol number, and identifiers of synchronization signal sources transmitted using an S-SSS or a PSBCH. In this example, a parameter pre-configured for transmission of an NR S-SSB may refer to values previously input to an NR V2X terminal. As another example, a parameter pre-configured (or predefined) for transmission of an NR S-SSB may refer to a parameter configured by a gNB through RRC when the NR V2X terminal configures an RRC connection with the gNB. Which synchronization signal source identifier is to be used by the NR V2X UE-1 may be determined using one of the following methods.

The NR V2X UE-1 may perform optional selection from synchronization signal source identifier groups predefined for NR V2X terminals located out of a coverage of the gNB.

The NR V2X UE-1 may perform optional selection from synchronization signal source identifier groups predefined for NR V2X terminals located out of the coverage of the gNB but located in the coverage of the eNB.

A cell ID of the eNB detected through an LTE PSS/SSS may be used as an identifier of a synchronization signal source for the NR V2X UE-1.

In the above description, it is specified that the SFN information acquired from an LTE PBCH by the NR V2X terminal may be reused for a DFN transmitted by the NR V2X terminal through a PSBCH. The NR V2X terminal may use DFN information to determine a position of a time/frequency resource for transmission of an NR S-SSB as described below.

In the above-described Alt2, the NR V2X terminal may not receive NR V2X SIB information, and thus may use only DFN information from the SFN information acquired from an LTE PBCH. Accordingly, the NR V2X UE-1 may use pre-configured values as values of a subframe number, a slot number, and symbol numbers for transmission of an NR S-SSB in a DFN. In this example, a pre-configured value may refer to a value embedded in a terminal, or may refer to a value most recently configured by the gNB. Further, the pre-configured value may change according to a carrier frequency at which NR V2X communication is performed.

In the above-described Alt2, the NR V2X terminal may not receive NR V2X SIB information, and thus the eNB may not control whether the NR V2X terminal should be synchronized with a GNSS, or whether the NR V2X terminal should be synchronized with an LTE PSS/SSS transmitted by the eNB itself. Further, the eNB may not transmit information on offsetDFN to the NR V2X terminal. Accordingly, when the NR V2X terminal should perform synchronization, in Equation 1, Equation 2, and Equation 3 described with reference to FIG. 6, the NR V2X terminal may configure offsetDFN so as to be 0, or may use a pre-configured value of offsetDFN.

As in Alt1, among NR V2X terminals each having capability to transmit an NR S-SSB in the coverage of the eNB, only terminals each having a history of reception of an SL synchronization signal (NR S-SSB) from the gNB or another NR V2X terminal may transmit an NR S-SSB. For example, only terminals, in each of which a predetermined value or value configured by a base station (X ms) or less passes from when an NR SSB has been received from the gNB or an NR S-SSB has been received from another NR V2X terminal, may transmit an NR S-SSB.

If an NR V2X terminal does not have capability to transmit an NR S-SSB, the relevant terminal may not transmit an NR S-SSB. Such a terminal may transmit NR V2X control information and data information based on the acquired subframe timing information and SFN information, or may receive NR V2X control information and data information transmitted by another terminal. In this example, pre-configured parameters may be used as parameters for transmission of NR V2X control information and data information. For example, the pre-configured parameters may include a subcarrier spacing, a waveform, a CP length, a time/frequency resource for transmission of NR V2X control information and data information, transmission power, and the like. The SFN information acquired from an LTE PBCH by the NR V2X terminal may be used to determine a position of a time/frequency resource of control information and data information transmitted by the NR V2X terminal In the above-described example, the NR V2X terminal may not receive NR V2X SIB information, and thus may use only DFN information from the SFN information acquired from an LTE PBCH. Accordingly, the NR V2X UE-1 may use pre-configured values as values of a subframe number, a slot number, and symbol numbers for transmission of NR V2X control information and data information in a DFN. In this example, a pre-configured value may refer to a value embedded in a terminal, or may refer to a value most recently configured by the gNB.

In the above-described Alt2, as in the above-described Alt1, the eNB may not control the transmission of an NR S-SSB by an NR V2X terminal located in a cell of the eNB itself, or the transmission of NR V2X control information and data information by the NR V2X terminal. Accordingly, identically to Alt1, in Alt2, the problems of unnecessary interference and unnecessary power consumption may occur. Therefore, one of the methods (among the NR V2X terminals each having capability to transmit an NR S-SSB in the coverage of the eNB, only terminals, each of which has a history of reception of an NR SSB from the gNB or a history of reception of an SL synchronization signal (NR S-SSB) from another NR V2X terminal, transmit an NR S-SSB) described by way of example in Alt1 may be applied to Alt2. Accordingly, among the NR V2X terminals each having capability to transmit an NR S-SSB in the coverage of the eNB, only terminals, each of which has a history of reception of an SL synchronization signal (NR S-SSB) from the gNB or another NR V2X terminal, may transmit an NR S-SSB. For example, only NR V2X terminals, in each of which a predetermined value or a value configured by a base station (X ms) or less passes from when an NR SSB has been received from the gNB or an NR S-SSB has been received from another NR V2X terminal, may transmit control information and data information for NR V2X.

Alt3: The NR V2X terminal may detect an LTE PSS/SSS transmitted by the eNB, and may decode an LTE PBCH. Then, the NR V2X terminal may decode an LTE V2X SIB transmitted by the eNB for an LTE V2X terminal.

The NR V2X terminal may detect an LTE PSS/SSS, and thus may acquire information on a subframe timing. Then, the NR V2X terminal may decode an LTE PBCH, and thus may acquire information on an SFN. Further, the NR V2X terminal may decode an LTE V2X SIB transmitted for an LTE V2X terminal. In this example, the LTE V2X SIB may include or not include a particular field for the NR V2X terminal. When a particular field for the NR V2X terminal is newly added to the LTE V2X SIB, the LTE V2X terminal does not interpret and may ignore the particular field. The NR V2X terminal interprets only the particular field newly added for the NR V2X terminal itself, and does not interpret and may ignore a field of the LTE V2X SIB for the LTE V2X terminal. As another example, the NR V2X terminal may interpret some or all of fields of the LTE V2X SIB for the LTE V2X terminal, and all of new fields added to the LTE V2X SIB for the NR V2X terminal.

For example, the NR V2X terminal may use, as it is, a parameter for configuring whether to transmit a synchronization signal for the LTE V2X terminal. More specifically, the eNB may transmit a threshold of RSRP through an LTE V2X SIB so that the LTE V2X terminal can determine whether to transmit a synchronization signal, and the LTE V2X terminal, which has capability to transmit an LTE SLSS and has received the threshold of the RSRP, may compare an RSRP value, measured using a cell-specific reference signal (CRS) transmitted by the eNB, with the threshold of the RSRP. If the measured RSRP value is less than the RSRP threshold configured by the eNB, the LTE V2X terminal may transmit an LTE SLSS. Similarly to this configuration, the NR V2X terminal having capability to transmit an NR S-SSB may compare an RSRP value, measured by the NR V2X terminal itself, with a threshold of RSRP transmitted by the eNB through an LTE V2X SIB, and thus may determine whether to transmit an NR S-SSB. The NR V2X terminal may not interpret the remaining fields of the LTE V2X SIB except for the above-described field. In this example, which field of the LTE V2X SIB should be interpreted by the NR V2X terminal may be pre-configured for the NR V2X terminal.

The eNB may configure, through an LTE V2X SIB, information on a time resource of an NR S-SSB transmitted by the NR V2X terminal. The information may be an offset of a subframe. More specifically, an offset of a subframe may refer to a start time point of a subframe in which an LTE SLSS can be transmitted with reference to SFN 0 of the eNB. For example, when an offset of a subframe is configured to be "2", an LTE SLSS may be transmitted in a second subframe of system frame #0 of the eNB. Such a rule may be identically applied to transmission of an NR S-SSB by the NR V2X terminal. In this example, in the second subframe of system frame #0 of the eNB, the LTE V2X terminal may transmit an LTE SLSS, and the NR V2X terminal may simultaneously transmit an NR S-SSB. In this example, as illustrated in FIG. 5, a subcarrier spacing used by the NR V2X terminal to transmit an NR S-SSB may be different from a subcarrier spacing used by the LTE V2X terminal. As an example, the LTE V2X terminal uses a subcarrier spacing of 15 kHz, but a subcarrier spacing of 60 kHz may be used to transmit an NR S-SSB. In this example, the NR V2X terminal may acquire information on an index of a subframe for transmission of an NR S-SSB, through offset information for transmission of an NR S-SSB included in the LTE V2X SIB. More specifically, through the LTE V2X SIB, the eNB may configure an offset for transmission of an NR S-SSB, or may configure the offset and a cycle of an NR S-SSB. As an example, the NR V2X terminal may acquire information on a subframe number for transmission of an NR S-SSB by using Equation 4 below.

$$\text{Offset} = (\text{SFN} \times 10 + \text{subframe number}) \bmod \text{cycle} \quad \text{Equation 4}$$

In Equation 4, after the NR V2X terminal decodes an LTE PBCH, information on an SFN may be acquired by the NR V2X terminal, and a fixed value (e.g., a fixed value is always used as a cycle of transmission of an NR S-SSB) may be used as information on a cycle, or information on a cycle may be configured by the eNB. In Equation 4, "mod" may represent the modulo operation.

However, the NR V2X terminal may not acquire information on a slot index for transmission of an NR S-SSB in a subframe by using Equation 4. One of the following methods may be applied to address this issue.

The NR V2X terminal may transmit an NR S-SSB by using a pre-configured slot index. For example, an NR S-SSB may be transmitted in a first slot of a subframe having the subframe number acquired using Equation 4.

The NR V2X terminal may acquire information on a slot number for transmission of an NR S-SSB in a subframe by using Equation 5 below.

$$\text{Offset} = (SFN \times 10 \times 2^n + \text{subframe number}) \bmod \text{cycle} \quad \text{Equation 5}$$

In Equation 5, after the NR V2X terminal decodes an LTE PBCH, information on an SFN may be acquired by the NR V2X terminal, and a fixed value (e.g., a fixed value is always used as a cycle of transmission of an NR S-SSB) may be used as information on a cycle, or information on a cycle may be configured by the eNB. In Equation 4, n's may have integer values of 0, 1, 2, 3 . . . , and for example, a subcarrier of 15 kHz may imply that n=0; and subcarriers of 30 kHz, 60 kHz, and 120 kHz may imply that n=1, n=2, and n=3, respectively. The value of n is only an example of the disclosure, and may be configured differently according to a subcarrier. In Equation 5, information on n may be acquired from the eNB by the NR V2X UE-1 through an LTE V2X SIB. As another example, the information on n may be pre-configured. In this example, the pre-configuration of the information on n may imply that a value embedded in a terminal is used. As still another example, an n value may have an association relationship with a carrier frequency at which NR V2X communication is performed. More specifically, if NR V2X communication is performed at a frequency f1, it may imply that n=0, and if NR V2X communication is performed at a frequency f2, it may imply that n=1. In this example, the NR V2X UE-1 may receive information on a carrier, through which an NR S-SSB should be transmitted by the NR V2X UE-1 itself, the information being configured by the eNB through an LTE V2X SIB. Alternatively, the information on the carrier used by the NR V2X UE-1 to transmit an NR S-SSB may be preconfigured (e.g., may be embedded in the NR V2X UE-1). In Equation 5, "mod" may represent the modulo operation.

By using Equation 5, the NR V2X terminal may acquire information on a slot index for transmission of an NR S-SSB in a subframe, but may not acquire information about on which symbols an NR S-SSB should be transmitted in a slot. At least one of the following methods may be applied to address this issue.

The NR V2X terminal may transmit an NR S-SSB by using a pre-configured symbol index. For example, when a pre-configured symbol index is 0, an NR S-SSB may be transmitted on a first symbol in a slot having the slot number acquired by the terminal.

By using Equation 6, the NR V2X terminal may acquire information on a symbol number for transmission of an NR S-SSB in a slot.

$$\text{Offset} = (SFN \times 10 \times 2^n \times 14 + \text{subframe number}) \bmod \text{cycle} \quad \text{Equation 6}$$

In Equation 6, after the NR V2X terminal decodes an LTE PBCH, information on an SFN may be acquired by the NR V2X terminal, and a fixed value (e.g., a fixed value is always used as a cycle of transmission of an NR S-SSB) may be used as information on a cycle, or information on a cycle may be configured by the eNB. In Equation 4, n's may have integer values of 0, 1, 2, 3 . . . , and for example, a subcarrier of 15 kHz may imply that n=0; and subcarriers of 30 kHz, 60 kHz, and 120 kHz may imply that n=1, n=2, and n=3, respectively. The value of n is only an example of the disclosure, and may be configured differently according to a subcarrier. In Equation 6, information on n may be acquired from the eNB by the NR V2X UE-1 through an LTE V2X SIB. As another example, the information on n may be pre-configured. In this example, the pre-configuration of the information on n may imply that a value embedded in a terminal is used. As still another example, an n value may have an association relationship with a carrier frequency at which NR V2X communication is performed. More specifically, if NR V2X communication is performed at a frequency f1, it may imply that n=0, and if NR V2X communication is performed at a frequency f2, it may imply that n=1. In this example, the NR V2X UE-1 may receive information on a carrier, through which an NR S-SSB should be transmitted by the NR V2X UE-1 itself, the information being configured by the eNB through an LTE V2X SIB. Alternatively, the information on the carrier used by the NR V2X UE-1 to transmit an NR S-SSB may be pre-configured (e.g., may be embedded in the NR V2X UE-1). In Equation 6, "mod" may represent the modulo operation.

Methods similar to the above-described examples may be applied to terminals, each of which does not transmit an NR S-SSB and transmits control information and data information for NR V2X communication. As an example, an eNB may configure, through an LTE V2X SIB, information on a time resource of LTE V2X control information and data information transmitted by an LTE V2X terminal. The information may include an offset and a bitmap of a subframe. More specifically, a bitmap may indicate a subframe in which control information and data information of LTE V2X can be transmitted. For example, if a bitmap is 01101001, it may imply that LTE V2X communication: can be performed only in a second subframe, a third subframe, and an eighth subframe which are configured to be 1's among the eight subframes, but cannot be performed in the remaining subframes which are configured to be 0's. Such a bitmap may include N bits, and repetitive transmission may be performed in a system frame number cycle. For example, when N=8 and a system frame includes 10240 subframes, the number of repetitions is 10240/8=1280. Alternatively, the number of repetitions of a bitmap may be configured by the eNB through an LTE V2X SIB. An offset of a subframe may refer to a start point of a subframe in which the bitmap starts with reference to SFN 0 of the eNB (or with reference to a particular SFN of the eNB). For example, when an offset of a subframe is configured to be 2 and a bitmap is 01101001, it can be noted that the bitmap starts from a second subframe with reference to SFN 0 of the eNB. For example, this configuration may imply that control information and data information of LTE V2X are transmitted from a fourth subframe with reference to SFN 0. These rules may be identically applied to transmission of NR V2X control information and data information of an NR V2X terminal.

As another example, the following configuration may be considered. When the offset is configured to be 2 in the above-described example, the LTE V2X terminal may apply the bitmap from a second subframe with reference to SFN 0 of the eNB, and the NR V2X terminal may apply the bitmap from a second slot with reference to SFN 0 of the eNB. Despite the same bitmap, the LTE V2X terminal may interpret the bitmap in a subframe unit, and the NR V2X terminal may reinterpret the bitmap in a slot unit. As described above, an LTE subframe may have a length of 1 ms, and slots applied to NR may be different depending on subcarrier spacings used to transmit NR V2X control information and data information. For example, when a subcarrier spacing of 30 kHz is used, a length of one slot may be 0.5 ms, when a subcarrier spacing of 60 kHz is used, a length of one slot may be 0.25 ms, and when a subcarrier spacing of 120 kHz is used, a length of one slot may be 0.125 ms.

Alt4: The NR V2X terminal may detect an LTE PSS/SSS transmitted by the eNB, may decode an LTE PBCH, and may decode LTE V2X SIB information configured for the LTE V2X terminal. Further, the NR V2X terminal may establish an RRC connection with the eNB.

The NR V2X terminal may establish an RRC connection with the eNB, and thus may receive a parameter for transmission of an NR S-SSB through UE-specific RRC configuration from the eNB.

In the above-described Alt3 or Alt4, the eNB may provide information on a parameter for transmission of an NR S-SSB by an NR V2X terminal located in the coverage of the eNB itself. In addition, the eNB may control whether to transmit an NR S-SSB in the coverage of the eNB itself, by using at least one of the following methods.

Alt-A: Whether to transmit an NR S-SSB may be controlled through an LTE V2X SIB. In this example, a particular field of an LTE V2X SIB may be used to indicate whether to transmit an NR S-SSB, and only the NR V2X terminal may acquire information on whether to transmit an NR S-SSB, from the relevant field. For example, the LTE V2X terminal may ignore the relevant field, may not acquire information from the relevant field, or may differently interpret information in the relevant field. Alt-A may be applied to the above-described Alt-3 or Alt-4.

The eNB may control whether the NR V2X terminal is to transmit an NR S-SSB, through a particular one bit of an LTE V2X SIB. For example, "0" may imply that an NR S-SSB cannot be transmitted in the coverage of the eNB itself, and "1" may imply that transmission of an NR S-SSB is allowed. As another example, control may be performed through ON/OFF. For example, "OFF" may imply that an NR S-SSB cannot be transmitted in the coverage of the eNB itself, and "ON" may imply that transmission of an NR S-SSB is allowed.

As another example, the eNB may implicitly control whether the NR V2X terminal is to transmit an NR S-SSB. For example, when an LTE V2X SIB includes configuration of parameters for transmission of an NR S-SSB, the NR V2X terminal may consider that an NR S-SSB can be transmitted in the coverage of the eNB, and may transmit an NR S-SSB by using the relevant parameters. When an LTE V2X SIB does not include configuration of parameters for transmission of an NR S-SSB, the NR V2X terminal may determine (or consider) that an NR S-SSB cannot be transmitted in the coverage of the eNB, and may not transmit an NR S-SSB.

Alt-B: Whether to transmit an NR S-SSB may be controlled through DCI or UE-specific RRC. The eNB may use a particular field of DCI or UE-specific RRC to control whether the NR V2X terminal RRC-connected to the eNB is to transmit an NR S-SSB. In Alt-B, the NR V2X terminal should establish an RRC connection with the eNB, and thus this configuration may be applied to only the above-described Alt4.

Figure 8:
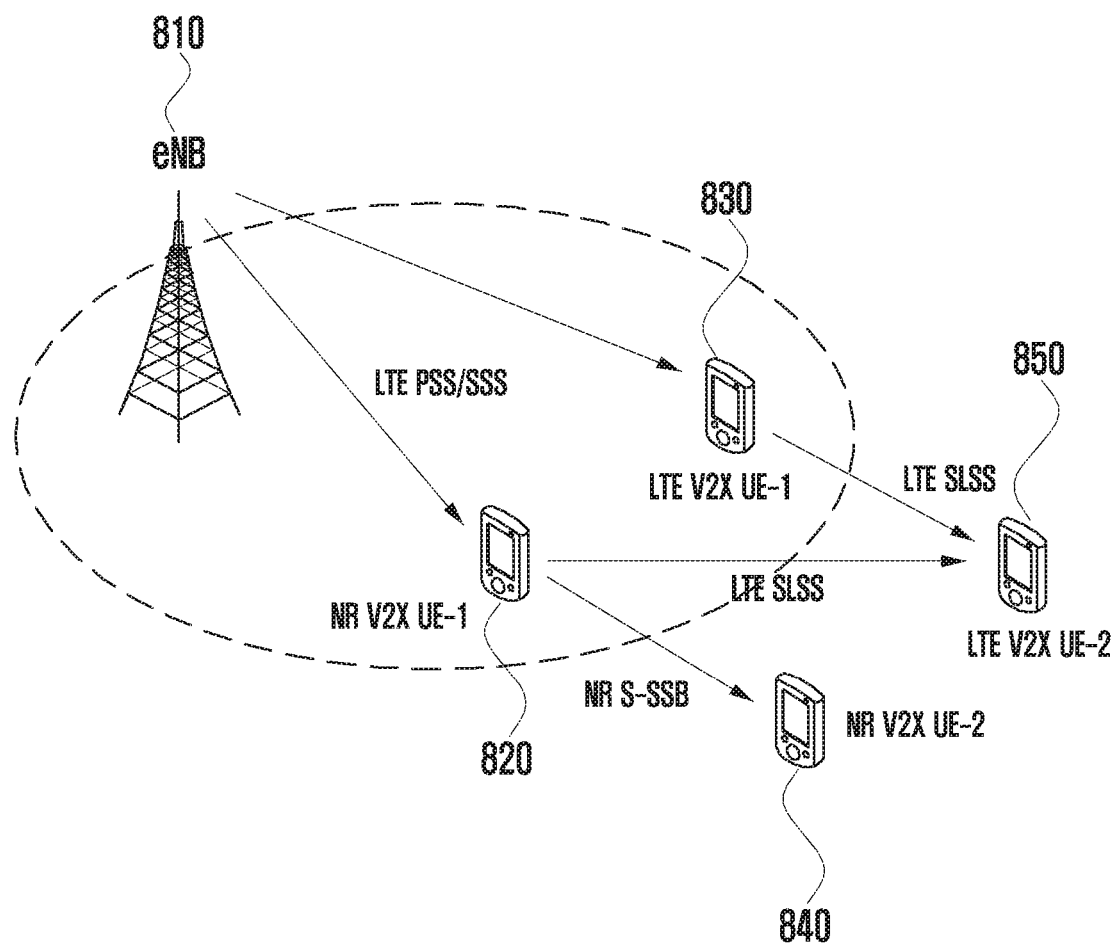
FIG. 8 illustrates an NR V2X synchronization procedure according to an embodiment of the disclosure.

FIG. 8 illustrates an NR V2X synchronization procedure according to an embodiment of the disclosure.

Referring to FIG. 8, an example is illustrated of an operation of an NR V2X terminal supporting Case 3) specified in FIG. 3. In this example, the NR V2X terminal supporting Case 3) refers to a terminal capable of supporting both NR V2X communication and LTE V2X communication through the NR Uu, the NR SL, the LTE Uu, and the LTE SL illustrated in FIG. 3.

FIG. 8 illustrates an example in which: an NR V2X UE-1 820 and an LTE V2X UE-1 830 are located in a coverage of an eNB 810, and an NR V2X UE-2 840 and an LTE V2X UE-2 850 are located out of the coverage of the eNB 810. The NR V2X UE-1 820 and the LTE V2X UE-1 830 are located in the coverage of the eNB 810, and thus may detect and receive an LTE PSS/SSS transmitted by the eNB 810, but the NR V2X UE-2 840 and the LTE V2X UE-2 850 are located out of the coverage of the eNB 810, and thus may not detect and receive an LTE PSS/SSS transmitted by the eNB 810. In FIG. 8, it is assumed that the NR V2X UE-1 820 located in the coverage of the eNB 810 selects the eNB 810 as a synchronization signal source by a determined rule. Differently from FIG. 7, in FIG. 8, it may be assumed that the NR V2X UE-1 820 has capability to transmit both an NR S-SSB and an LTE SLSS.

In the following examples, it may be assumed that NR V2X terminals located in the coverage of the eNB 810 select the eNB 810 as a synchronization signal source. Further, this configuration may imply that each of the NR V2X terminals has capability to detect an LTE PSS/SSS which is a synchronization signal of the eNB 810 (Alt1).

As another example, NR V2X terminals having selected the eNB 810 as a synchronization signal source may imply that each of the NR V2X terminals has capability to detect an LTE PSS/SSS and decode an LTE PBCH (Alt2).

As still another example, NR V2X terminals having selected the eNB 810 as a synchronization signal source may imply that each of the NR V2X terminals is capable of detecting an LTE PSS/SSS, decoding an LTE PBCH, and further decoding LTE V2X SIB information configured for an LTE V2X terminal (Alt3).

On these various assumptions, the NR V2X terminal may perform one of the various operations described with reference to FIG. 7 in order to transmit control information and data information for transmission of an NR S-SSB or for NR V2X communication in the coverage of the eNB. Differently from FIG. 7, in FIG. 8, the NR V2X terminal may transmit not only an NR S-SSB but also an LTE SLSS, and thus it may be necessary to establish an operation of a base station and an operation of a terminal in this configuration.

For example, transmission of an LTE SLSS may comply with an operation standardized in the legacy LTE V2X. Further, an operation for transmission of an NR S-SSB may comply with one of the various operations described with reference to FIG. 7. However, when a corresponding configuration complies with the operations described with reference to FIG. 7, there may occur a case in which the NR V2X UE-1 should transmit an LTE SLSS and an NR S-SSB at the same time. For example, although a cycle of transmission of an LTE SLSS is identical to, or different from, a cycle of transmission of an NR S-SSB, there may exist, a case in which an NR S-SSB is repetitively transmitted, a case in which an intersection is generated between the cycle of transmission of an LTE SLSS and the cycle of transmission of an NR S-SSB (e.g., when the cycle of transmission of an LTE SLSS is 160 ms and the cycle of transmission of an NR S-SSB is 80 ms), or the like. In these cases, one of the following operations may be considered.

Simultaneous transmission of an LTE SLSS and an NR S-SSB is not allowed, and the NR V2X UE-1 may transmit only one of an LTE SLSS and an NR S-SSB. Which one among the LTE SLSS and the NR S-SSB should be transmitted may comply with a predetermined rule. In this example, various rules may exist, and one of the following rules may be considered.

An LTE SLSS always has a priority, and an NR S-SSB is not transmitted (or vice versa).

When an NR S-SSB is transmitted at a particular carrier frequency, the NR S-SSB has higher priority than that of an LTE SLSS, and otherwise, an LTE SLSS may have a higher priority than that of an NR S-SSB. For example, at a carrier frequency using hybrid beamforming, in order to increase a coverage, an operation, such as beam sweeping or beam management between NR V2X terminals may be necessary. At such a carrier frequency, an NR S-SSB may have a higher priority than that of an LTE SLSS.

An SL synchronization signal having a higher priority is transmitted based on a priority provided by a higher layer. An SL synchronization signal having a lower priority is not transmitted.

An SL synchronization signal having a short (or long) cycle is transmitted, and a remaining SL synchronization signal is not transmitted.

Simultaneous transmission of an LTE SLSS and an NR S-SSB is allowed, and when an LTE SLSS and an NR S-SSB should be simultaneously transmitted, the NR V2X UE-1 may transmit both an LTE SLSS and an NR S-SSB. In this example, transmission power of the NR V2X UE-1 needs to be distributed for use among an LTE SLSS and an NR S-SSB, and thus the NR V2X UE-1 may simultaneously transmit an LTE SLSS and an NR S-SSB. For example, when it is assumed that transmission power of an LTE SLSS is P_LTE and transmission power of an NR S-SSB is P_NR, P_LTE+P_NR≤Pcmax should be satisfied. In this example, Pcmax may represent a maximum transmission power value which can be configured by a terminal. P_LTE and P_NR may be configured by the eNB through an LTE V2X SIB or UE-specific RRC.

The eNB may configure whether the NR V2X UE-1 can simultaneously transmit an LTE SLSS and an NR S-SSB, through an LTE V2X SIB or UE-specific RRC.

Figure 9:
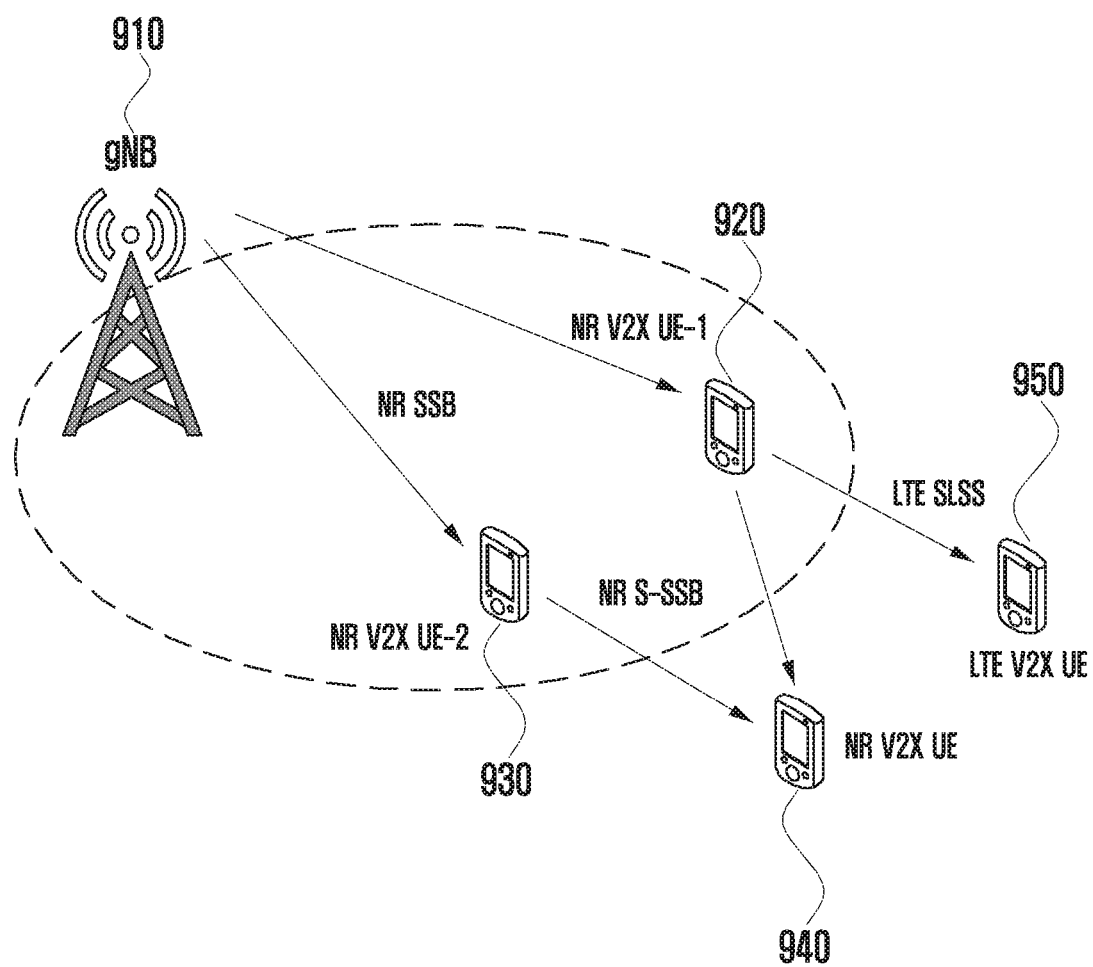
FIG. 9 illustrates an NR V2X synchronization procedure according to an embodiment of the disclosure.

FIG. 9 illustrates an NR V2X synchronization procedure according to an embodiment of the disclosure.

Referring to FIG. 9, another example is illustrated of an operation of an NR V2X terminal supporting Case 3) specified in FIG. 3. In this example, the NR V2X terminal supporting Case 3) refers to a terminal capable of supporting both NR V2X communication and LTE V2X communication through the NR Uu, the NR SL, the LTE Uu, and the LTE SL illustrated in FIG. 3.

FIG. 9 illustrates an example in which: an NR V2X UE-1 920 and an NR V2X UE-2 930 are located in a coverage of an gNB 910, and an NR V2X UE 940 and an LTE V2X UE 950 are located out of the coverage of the gNB 910. The NR V2X UE-1 920 and the NR V2X UE-2 930 are located in the coverage of the gNB 910, and thus may detect and receive an NR SSB transmitted by the gNB 910, but the NR V2X UE 940 and the LTE V2X UE 950 are located out of the coverage of the gNB 910, and thus may not detect and receive an NR SSB transmitted by the gNB 910 (Further, even when the LTE V2X UE is located in the coverage of the gNB, the LTE V2X UE may not detect and receive an NR SSB).

In FIG. 9, it is assumed that the NR V2X UE-1 920 and the NR V2X UE-2 930 located in the coverage of the gNB 910 select the gNB 910 as a synchronization signal source by a determined rule. Differently from FIG. 7, in FIG. 9, it may be assumed that the NR V2X UE-1 920 has capability to transmit both an NR S-SSB and an LTE SLSS.

Differently from FIG. 8, in FIG. 9, an NR V2X terminal having capability to transmit both an NR S-SSB and an LTE SLSS is located in the coverage of the gNB 910, and is to transmit an LTE SLSS in the coverage of the gNB 910. As specified in FIG. 7 and FIG. 8, a subcarrier spacing and a waveform used to transmit an LTE SLSS may be different from those used to transmit an NR S-SSB. Accordingly, when the NR V2X UE-1 920 transmits an LTE SLSS in the coverage of the gNB 910, interference may be caused to a terminal performing NR V2X communication and a terminal performing NR communication in the coverage of the gNB 910. Therefore, the NR V2X UE-1 920 needs control by the gNB 910 to transmit an LTE SLSS, and in this configuration, it may be necessary to establish transmission of control information by the gNB 910 and an operation of a terminal.

In the following examples, it may be assumed that NR V2X terminals located in the coverage of the gNB select the eNB as a synchronization signal source. The gNB may consider one of the following operations in order to transmit control information and data information for transmission of an LTE SLSS or execution of LTE V2X communication by the NR V2X terminal in the coverage of the gNB itself.

Alt1: The NR V2X terminal may transmit an LTE SLSS based on a subframe timing of an NR SSB transmitted by the gNB.

If the NR V2X terminal has capability to transmit an LTE SLSS, an NR terminal of the gNB may transmit an LTE SLSS based on a subframe timing acquired from an SSB. In this example, pre-configured parameters may be used as parameters for transmission of an LTE SLSS. For example, the pre-configured parameters may include at least one of a CP length, a time/frequency resource for transmission of an LTE SLSS, transmission power of an LTE SLSS, a DFN, a subframe number, and identifiers of synchronization signal sources transmitted using an LTE SLSS or an LTE PSBCH. In this example, a parameter pre-configured for transmission of an LTE SLSS may refer to values previously input to an LTE V2X terminal. As another example, a parameter pre-configured (or predefined) for transmission of an LTE SLSS may refer to a parameter configured by an eNB through RRC when the NR V2X UE-1 configures an RRC connection with the eNB. Which synchronization signal source identifier is to be used by the NR V2X UE-1 during transmission of an LTE SLSS may be determined using one of the following methods.

The NR V2X UE-1 may perform optional selection from synchronization signal source identifier groups predefined for terminals capable of transmitting an LTE SLSS and located out of a coverage of the eNB.

The NR V2X UE-1 may perform optional selection from synchronization signal source identifier groups predefined for terminals capable of transmitting an LTE SLSS and located out of the coverage of the eNB but located in the coverage of the gNB.

A cell ID of the gNB may be used as an identifier of a synchronization signal source for transmission of an LTE SLSS.

An NR V2X terminal which does not have capability to transmit an LTE SLSS but has capability to perform LTE V2X communication may transmit LTE V2X control information and data information based on the acquired subframe timing, or may receive LTE V2X control information and data information, transmitted by another terminal, based on the acquired subframe timing. In this example, pre-configured parameters may be used as parameters for transmission of LTE V2X control information and data information. For example, the pre-configured parameters may include a CP length, a time/frequency resource for transmission of LTE V2X control information and data information, transmission power, and the like. A parameter pre-configured for transmission of LTE V2X control information and data information may refer to values input to the LTE V2X terminal at the time of release of the LTE V2X terminal. As another example, a parameter pre-configured for transmission of LTE V2X control information and data information may refer to a parameter configured by the eNB through RRC when the NR V2X UE-1 configures an RRC connection with the eNB.

In the above-described Alt1, the gNB does not control the transmission of an LTE SLSS by an NR V2X terminal located in a cell of the gNB itself, or the transmission of LTE V2X control information and data information by the NR V2X terminal Since LTE V2X can use a subcarrier spacing and a waveform different from those of the NR system, when control of LTE V2X communication is not performed in the coverage of a gNB base station, unnecessary interference to the NR system may be caused. Further, the NR V2X terminal having capability to transmit an LTE SLSS should always transmit an LTE SLSS regardless of a distance from the gNB, and thus may cause unnecessary power consumption. For example, in the case of Alt1, if an NR V2X terminal close to the gNB has capability to transmit an LTE SLSS, the NR V2X terminal may transmit an LTE SLSS. In this example, an LTE SLSS transmitted by an NR V2X terminal located in the coverage of the gNB may not arrive at an LTE V2X terminal located out of the coverage of the gNB. Therefore, unnecessary transmission of an LTE SLSS may occur. In order to address these issues, the following methods may be considered.

Among NR V2X terminals having capability to transmit an LTE SLSS in the coverage of the gNB, only terminals, each of which has a history of reception of an SL synchronization signal (LTE SLSS) from the eNB or another LTE V2X terminal, may transmit an LTE SLSS. More specifically, only NR V2X terminals, each of which takes a predetermined value or a value configured by a base station (X ms) or less until receiving an NR SSB currently transmitted by the gNB from when an LTE PSS/SSS transmitted by the eNB has been received, may transmit an LTE SLSS in the coverage of the gNB. In this configuration, for example, X ms may be determined based on the time required by the NR V2X terminal to leave the coverage of the eNB and enter the coverage of the gNB. For example, if the value of X is small, it means that the time required by the NR V2X terminal to leave the coverage of the eNB and enter the coverage of the gNB is short, and this situation may mean that the NR V2X terminal is located on the edge of the coverage of the gNB. Accordingly, transmission of an LTE SLSS may be limited so that NR V2X terminals, located on the edge of the coverage of the gNB, transmit an LTE SLSS.

By this configuration, it is possible to reduce unnecessary power consumption of a terminal which is generated when an LTE V2X terminal located out of the coverage of the gNB fails to receive an LTE SLSS transmitted by an NR V2X terminal located inside the coverage of the gNB. For the same reason as that for this configuration, transmission of an LTE SLSS may be limited so that only terminals, each of which has a history of reception of an SL synchronization signal (LTE SLSS) from another LTE V2X terminal, transmit an LTE SLSS in the coverage of the gNB. In the above-described examples, the description focuses on the transmission of an LTE SLSS, but the above-described configuration may be identically applied to a case in which an NR V2X terminal transmits control information and data information for LTE V2X communication in the coverage of the gNB.

Alt2: The NR V2X terminal may transmit an LTE SLSS based on a subframe timing and a SFN of an NR SSB transmitted by the gNB.

When the NR V2X terminal has capability to transmit an NR S-SSB, the NR V2X terminal may transmit an LTE SLSS based on the acquired subframe timing information and SFN information. In this example, parameters pre-configured may be used as parameters for transmission of an LTE SLSS. However, Alt2 differs from Alt1 in that in Alt2, information on an SFN is used and thus may be used for a DFN. Accordingly, parameters pre-configured for transmission of an NR S-SSB in Alt2 may include at least one of a CP length, a time/frequency resource for transmission of an LTE SLSS, transmission power of an LTE SLSS, a subframe number, and identifiers of synchronization signal sources transmitted using an LTE SSSS or an LTE PSBCH. In this example, a parameter pre-configured for transmission of an LTE SLSS may refer to values previously input to a terminal having an LTE V2X function. As another example, a parameter pre-configured (or predefined) for transmission of an LTE SLSS may refer to a parameter configured by an eNB through RRC when the NR V2X UE-1 configures an RRC connection with the eNB. Which synchronization signal source identifier is to be used by the NR V2X UE-1 may be determined using one of the following methods.

The NR V2X UE-1 may perform optional selection from synchronization signal source identifier groups predefined for LTE V2X terminals located out of a coverage of the eNB.

The NR V2X UE-1 may perform optional selection from synchronization signal source identifier groups predefined for NR V2X terminals having an LTE V2X function located out of the coverage of the eNB but located in the coverage of the gNB.

A cell ID of the gNB may be used as an identifier of a synchronization signal source for the NR V2X UE-1.

In the above description, it is specified that the SFN information acquired from the gNB by the NR V2X terminal may be reused for a DFN transmitted by the NR V2X terminal through an LTE PSBCH. The NR V2X terminal may use DFN information to determine a position of a time/frequency resource for transmission of an LTE SLSS as described below.

In the above-described Alt2, the gNB provides only a subframe timing and an SFN for transmission of an LTE SLSS by the NR V2X UE-1, and thus the NR V2X UE-1 may use a pre-configured value as a value of a subframe number for transmission of an LTE SLSS in a DFN. In this example, a pre-configured value may refer to a value embedded in a terminal, or may refer to a value most recently configured by the eNB. Further, the pre-configured value may change according to a carrier frequency at which LTE V2X communication is performed.

In the above-described Alt2, the gNB may not control whether an LTE SLSS transmitted by the NR V2X UE-1 should be transmitted based on a GNSS or a timing of the gNB. Further, the gNB may not transmit offsetDFN information for transmission of an LTE SLSS to the NR V2X UE-1. Accordingly, when the NR V2X UE-1 should perform synchronization with a GNSS, the NR V2X UE-1 may configure offsetDFN so as to be 0 in Equation 1 described with reference to FIG. 6, or may transmit an LTE SLSS by using a pre-configured value of offsetDFN.

As in Alt1, among NR V2X terminals each having capability to transmit an LTE SLSS in the coverage of the gNB, only terminals each having a history of reception of an LTE PSS/SSS from the eNB or a history of reception of an LTE SLSS from another LTE V2X terminal may transmit an LTE SLSS. For example, only terminals, in each of which a predetermined value or a value configured by a base station (X ms) or less passes from when an LTE PSS/SSS has been received from the eNB or an LTE SLSS has been received from another LTE V2X terminal, may transmit an LTE SLSS.

If an NR V2X terminal does not have capability to transmit an LTE SLSS but has capability to transmit control information and data information for LTE V2X, the relevant terminal may transmit LTE V2X control information and data information based on the acquired subframe timing information and SFN information, or may receive LTE V2X control information and data information transmitted by another terminal. In this example, pre-configured parameters may be used as parameters for transmission of LTE V2X control information and data information. For example, the pre-configured parameters may include a CP length, a time/frequency resource for transmission of LTE V2X control information and data information, transmission power, and the like. The SFN information acquired from the gNB by the NR V2X terminal may be used to determine a position of a time/frequency resource of control information and data information transmitted by the NR V2X terminal.

In the above-described example, the NR V2X terminal uses only subframe timing information and SFN information acquired from the gNB, and thus the NR V2X UE-1 may use a pre-configured value as a value of a subframe number for transmission of LTE V2X control information and data information in a DFN. In this example, a pre-configured value may refer to a value embedded in a terminal, or may refer to a value most recently configured by the eNB.

In the above-described Alt2, as in the above-described Alt1, the gNB does not control the transmission of an LTE SLSS by an NR V2X terminal having capability to transmit an LTE SLSS and located in a cell of the gNB itself, or the transmission of LTE V2X control information and data information by the NR V2X terminal. Accordingly, identically to Alt1, in Alt2, the problems of unnecessary interference and unnecessary power consumption may occur. Therefore, one of the methods (among the NR V2X terminals each having capability to transmit an LTE SLSS in the coverage of the gNB, only terminals, each of which has a history of reception of an LTE SLSS from the eNB or a history of reception of an LTE SLSS from another LTE V2X terminal, transmit an LTE SLSS) described by way of example in Alt1 may be applied to Alt2. Accordingly, among the NR V2X terminals each having capability to transmit an LTE SLSS in the coverage of the gNB, only terminals, each of which has a history of reception of an LTE PSS/SSS from the eNB or a history of reception of an LTE SLSS from another LTE V2X terminal, may transmit an LTE SLSS. For example, only NR V2X terminals, in each of which a predetermined value or a value configured by a base station (X ms) or less passes from when an LTE PSS/SSS has been received from the eNB or an LTE SLSS has been received from another LTE V2X terminal, may transmit control information and data information for LTE V2X.

Alt3: The NR V2X terminal may transmit an LTE SLSS based on a subframe timing of an NR SSB, an SFN thereof, and NR V2X SIB information which are transmitted by the gNB.

The gNB may include or not include a parameter for transmission of an LTE SLSS by the NR V2X terminal, in an NR V2X SIB. When a particular field for transmission of an LTE SLSS is newly added to the NR V2X SIB, an NR V2X terminal which does not have capability to transmit an LTE SLSS does not interpret and may ignore the particular field. As another example, the gNB may transmit a separate SIB for transmission of an LTE SLSS by an NR V2X terminal having capability to transmit an LTE SLSS. In this example, the SIB may be transmitted using an RNTI different from that of an NR V2X SIB.

In contrast, when a parameter for transmission of an LTE SLSS by the NR V2X terminal is not added to an NR V2X SIB, the NR V2X terminal may transmit an LTE SLSS by using some or all of parameters configured for transmission of an NR S-SSB. For example, the gNB may transmit, through an NR V2X SIB, a threshold of RSRP for determination of whether to transmit an NR S-SSB, and the NR V2X terminal, which has capability to transmit an LTE SLSS and has received the threshold of the RSRP, may compare an RSRP value, measured by the NR V2X terminal itself, with the RSRP threshold transmitted by the gNB. If the measured RSRP value is less than the RSRP threshold configured by the gNB, the NR V2X UE-1 may transmit an LTE SLSS. The NR V2X terminal may not apply, to transmission of an LTE SLSS, the remaining fields of the NR V2X SIB except for the above-described field. In this example, which field of the NR V2X SIB should be applied to transmission of an LTE SLSS by the NR V2X terminal may be pre-configured for the NR V2X terminal.

As another example, for offset information for transmission of an LTE SLSS, the NR V2X UE-1 may use offset information that the gNB has configured for transmission of an NR S-SSB through an NR V2X SIB. As an example, it may be assumed that the gNB configures use of a subcarrier spacing of 15 kHz×$2^n$(n=0, 1, 2, 3, . . . ) for transmission of an NR S-SSB. Further, it may be assumed that the gNB configures, so as to be "s", a slot in which transmission of an NR S-SSB is started (i.e., an offset is configured to be "s"). In this example, the NR V2X UE-1 may determine a subframe, in which an LTE SLSS can be transmitted, through "s" mod $2^n$.

The gNB may configure information on a time resource of an LTE SLSS, transmitted by the NR V2X terminal, through an NR V2X SIB or a separate SIB. The information on a time resource may be an offset of a subframe. More specifically, an offset of a subframe may refer to a start time point of a subframe in which an LTE SLSS can be transmitted with reference to SFN 0 of the gNB. Alternatively, the gNB notifies of a start point in a slot unit, and the NR V2X UE-1 may identify (or infer) a subframe, in which an LTE SLSS can be transmitted, through "s" mod 2".

Methods similar to the above-described examples may be applied to terminals, each of which does not transmit an LTE SLSS and transmits control information and data information for LTE V2X communication. As an example, a gNB may configure, through an NR V2X SIB or a separate SIB, information on a time resource of LTE V2X control information and data information transmitted by an NR V2X UE-1. In this example, a separate SIB may not be interpreted by an NR V2X terminal which does not have capability to transmit or receive LTE V2X control information and data information.

Information on a time resource of LTE V2X control information and data information transmitted by the NR V2X UE-1 may include an offset and a bitmap of a subframe. More specifically, a bitmap may indicate a subframe in which control information and data information of LTE V2X can be transmitted. For example, if a bitmap is 01101001, it may imply that LTE V2X communication: can be performed only in a second subframe, a third subframe, and an eighth subframe which are configured to be 1's among the eight subframes, but cannot be performed in the remaining subframes which are configured to be 0's. Such a bitmap may include N bits, and repetitive transmission may be performed in a system frame number cycle. For example, when N=8 and a system frame includes 10240 subframes, the number of repetitions is 10240/8=1280. Alternatively, the number of repetitions of a bitmap may be configured by the gNB through an NR V2X SIB or a separate SIB. An offset of a subframe may refer to a start point of a subframe in which the bitmap starts with reference to SFN 0 of the gNB (or with reference to a particular SFN of the gNB). For example, when an offset of a subframe is configured to be 2 and a bitmap is 01101001, it can be noted that the bitmap starts from a second subframe with reference to SFN 0 of the gNB.

Alt4: The NR V2X terminal may configure an RRC connection with the gNB, and may receive parameters for transmission of an LTE SLSS configured by the gNB through UE-specific RRC.

In the above-described Alt3 or Alt4, the gNB may provide information on a parameter for transmission of an LTE SLSS by an NR V2X UE-1 located in the coverage of the gNB itself. In addition, the gNB may control whether to transmit an LTE SLSS in the coverage of the gNB itself, by using at least one of the following methods.

Alt-A: Whether to transmit an LTE SLSS may be controlled through an NR V2X SIB. In this example, a particular field of an NR V2X SIB may be used to indicate whether to transmit an LTE SLSS, and only the NR V2X terminal having capability to transmit an LTE SLSS may acquire information on whether to transmit an LTE SLSS, from the relevant field. For example, an NR V2X terminal which does not have capability to transmit an LTE SLSS may ignore the relevant field, may not acquire information from the relevant field, or may differently interpret information in the relevant field. Alt-A may be applied to the above-described Alt-3 or Alt-4.

The gNB may control whether the NR V2X UE-1 is to transmit an LTE SLSS, through a particular one bit of an NR V2X SIB. For example, "0" may imply that an LTE SLSS cannot be transmitted in the coverage of the gNB itself, and "1" may imply that transmission of an LTE SLSS is allowed. As another example, control may be performed through ON/OFF. For example, "OFF" may imply that an LTE SLSS cannot be transmitted in the coverage of the gNB itself, and "ON" may imply that transmission of an LTE SLSS is allowed.

As another example, the gNB may implicitly control whether the NR V2X UE-1 is to transmit an LTE SLSS. For example, when an NR V2X SIB includes configuration of parameters for transmission of an LTE SLSS, the NR V2X UE-1 may consider that an LTE SLSS can be transmitted in the coverage of the gNB, and may transmit an LTE SLSS by using the relevant parameters. When an NR V2X SIB does not include configuration of parameters for transmission of an LTE SLSS, the NR V2X UE-1 may determine (or consider) that an LTE SLSS cannot be transmitted in the coverage of the gNB, and may not transmit an LTE SLSS.

Alt-B: Whether to transmit an LTE SLSS Control may be controlled through DCI or UE-specific RRC. The gNB may use a particular field of DCI or UE-specific RRC to control whether the NR V2X UE-1 RRC-connected to the gNB is to transmit an LTE SLSS. In Alt-B, the NR V2X UE-1 should establish an RRC connection with the gNB, and thus this configuration may be applied to only the above-described Alt4.

Figure 10:
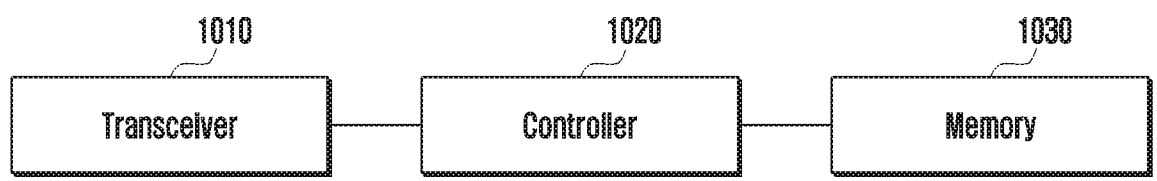
FIG. 10 is a block diagram illustrating a configuration of a terminal according to an embodiment of the disclosure.

FIG. 10 is a block diagram illustrating a configuration of a terminal according to an embodiment of the disclosure.

In the disclosure, an NR V2X terminal or an LTE V2X terminal may include the configuration illustrated in FIG. 10.

Referring to FIG. 10, according to various embodiments of the disclosure, the terminal may include a transceiver 1010, a controller 1020, and a memory 1030. For example, when defining a controller in the specification, it may be stated that "the controller may be a circuit, an application-specific integrated circuit or at least one processor."

According to an embodiment of the disclosure, the terminal may receive a synchronization signal from a base station through the transceiver 1010. For example, when the base station is an LTE base station, the terminal may receive a PSS and an SSS through the transceiver 1010, and when the base station is an NR base station, the terminal may receive an SSB through the transceiver 1010. According to various embodiments of the disclosure, the terminal may transmit an SL synchronization signal to another terminal through the transceiver 1010.

According to an embodiment of the disclosure, the terminal may decode a PBCH through the controller 1020. For example, the controller 1020 may decode a PBCH included in an SSB received from the NR base station, and thus may acquire DFN information included in the SSB. According to various embodiments of the disclosure, the controller 1020 may determine a parameter related to transmission of an SL synchronization signal based on information received from the base station and information stored in the memory 1030.

According to an embodiment of the disclosure, the memory 1030 may store parameter information for transmission of an SL synchronization signal to another terminal by the terminal. For example, the memory 1030 may store pieces of information on a pre-configured subcarrier spacing, a waveform, a CP length, a time/frequency resource for transmission of an SSB, SSB transmission power, and the like.

Figure 11:
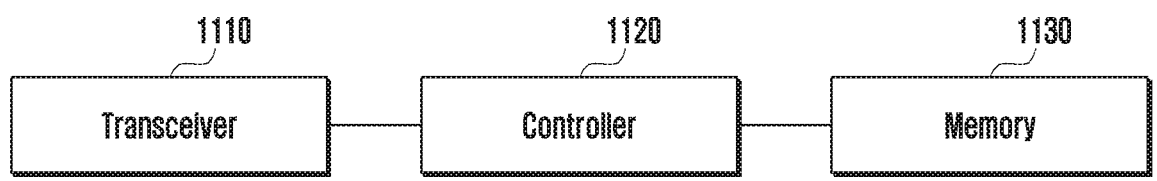
FIG. 11 is a block diagram illustrating a configuration of a base station according to an embodiment of the disclosure.

FIG. 11 is a block diagram illustrating a configuration of a base station according to an embodiment of the disclosure.

In the disclosure, an eNB or a gNB may include the configuration illustrated in FIG. 11.

Referring to FIG. 11, according to various embodiments of the disclosure, the base station may include a transceiver 1110, a controller 1120, and a memory 1130.

According to an embodiment of the disclosure, the base station may transmit a synchronization signal to a terminal through the transceiver 1110. For example, when the base station is an eNB, the base station may transmit a PSS and an SSS to the terminal through the transceiver 1110, and when the base station is a gNB, the base station may transmit an SSB to the terminal through the transceiver 1110.

According to an embodiment, the controller 1120 may control whether the terminal is to transmit an SL synchronization signal. For example, the controller 1120 may control whether the terminal is to transmit an SL synchronization signal to another terminal, through a particular one bit included in a SIB transmitted to the terminal According to various embodiments of the disclosure, the controller 1120 may control whether the terminal is to transmit an SL synchronization signal to another terminal, by using a particular field of DCI or UE-specific RRC.

According to an embodiment, the memory 1130 may store information received through the transceiver 1110 or at least one piece of information determined by the controller 1120.

Meanwhile, in the drawings illustrating a method in embodiments of the disclosure, the order of description does not necessarily correspond to the order of execution, and the order relationship may be changed or executed in parallel.

Alternatively, the drawings illustrating the method of the disclosure may omit some of the elements and may include only some of the elements without impairing the essence of the disclosure.

Further, the method of the disclosure may be carried out in combination with some or all of the contents included in each embodiment without departing from the essence of the disclosure.

In the drawings for description of the methods of the disclosure, the order of the description does not necessarily correspond to the order of execution, and operations may not be order-dependent or may be executed in parallel.

Alternatively, in the drawings for description of the methods of the disclosure, some elements may be omitted and only some elements may be included without departing from the essence of the disclosure.

Further, the methods of the disclosure may be executed through combination of some or all of the contents included in the respective embodiments, without departing from the essence of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for transmitting a synchronization signal performed by a first terminal in a communication system supporting a sidelink between the first terminal and a second terminal, the method comprising:
   receiving, from a base station, configuration information associated with a sidelink synchronization, the configuration information including a threshold value, a number of times of repetitive transmissions of at least one sidelink synchronization signal block (SSB) within a cycle, a time interval between at least two SSBs, and a slot offset;
   identifying a resource for transmission of the at least one sidelink SSB based on the configuration information; and
   in case that a reference signal received power (RSRP) measured by the first terminal is below the threshold value, transmitting, to the second terminal, the at least one sidelink SSB on the resource based on the number of times of repetitive transmissions of the at least one sidelink SSB within the cycle.

2. The method of claim 1, wherein the configuration information is received through system information or radio resource control (RRC) information.

3. The method of claim 1,
   wherein the configuration information further includes information indicating a synchronization reference source indicating a global navigation satellite system (GNSS) or a base station, and
   wherein, in case that the GNSS is selected as the synchronization reference source, a slot number of the resource is determined based on a current time, a timing offset, and a subcarrier spacing.

4. The method of claim 1, wherein transmitting the at least one SSB comprises:
   in case that a transmission of a first sidelink SSB associated with a long term evolution (LTE) radio access overlaps in time with a transmission of a second sidelink SSB associated with a new radio (NR) radio access, transmitting a sidelink SSB related to a radio access with highest priority, and
   wherein a priority of the at least one sidelink SSB is received through higher layer signaling.

5. The method of claim 1,
   wherein the cycle is 160 milliseconds (ms).

6. The method of claim 1,
   wherein receiving the configuration information associated with the sidelink synchronization further comprises transmitting, to the base station, capability information including information indicating whether the first terminal supports a synchronization source for new radio (NR) sidelink.

7. A first terminal for transmitting a synchronization signal in a communication system supporting a sidelink between the first terminal and a second terminal, the first terminal comprising:
   a transceiver; and
   at least one processor coupled with the transceiver and configured to:
      receive, from a base station, configuration information associated with a sidelink synchronization, the configuration information including a threshold value, a number of times of repetitive transmissions of at least one sidelink synchronization signal block (SSB) within a cycle, a time interval between at least two SSBs, and a slot offset,
      identify a resource for transmission of the at least one sidelink SSB based on the configuration information, and
      in case that a reference signal received power (RSRP) measured by the first terminal is below the threshold value, transmit, to the second terminal, the at least one sidelink SSB on the resource based on the number of times of repetitive transmissions of the at least one sidelink SSB within the cycle.

8. The first terminal of claim 7, wherein the configuration information is received through system information or radio resource control (RRC) information.

9. The first terminal of claim 7, wherein the configuration information further includes information indicating a synchronization reference source indicating a global navigation satellite system (GNSS) or a base station, and wherein, in case that the GNSS is selected as the synchronization reference source, a slot number of the resource is determined based on a current time, a timing offset, and a subcarrier spacing.

10. The first terminal of claim 7, wherein, in case that a transmission of a first sidelink SSB associated with a long term evolution (LTE) radio access overlaps in time with a transmission of a second sidelink SSB associated with a new radio (NR) radio access, the at least one processor is further configured to transmit a sidelink SSB related to a radio access with highest priority, and wherein a priority of the at least one sidelink SSB is received through higher layer signaling.

11. The first terminal of claim 7, wherein the cycle is 160 milliseconds (ms).

12. The first terminal of claim 7, wherein the at least one processor is further configured to transmit, to the base station, capability information including information indicating whether the first terminal supports a synchronization source for new radio (NR) sidelink.

* * * * *